US005799105A

United States Patent [19]
Tao

[11] Patent Number: 5,799,105
[45] Date of Patent: Aug. 25, 1998

[54] METHOD FOR CALIBRATING A COLOR SORTING APPARATUS

[75] Inventor: Yang Tao, Woodstock, Va.

[73] Assignee: Agri-Tech, Inc., Woodstock, Va.

[21] Appl. No.: 439,102

[22] Filed: May 11, 1995

Related U.S. Application Data

[60] Division of Ser. No. 293,431, Aug. 19, 1994, Pat. No. 5,533,628, which is a continuation-in-part of Ser. No. 846,236, Mar. 6, 1992, Pat. No. 5,339,963.

[51] Int. Cl.[6] .......... G06K 9/00

[52] U.S. Cl. .......... 382/167; 348/30; 348/187; 358/520; 382/141

[58] Field of Search .......... 382/141, 165, 382/167, 110; 209/580, 581, 586, 939, 938; 348/254, 255, 260, 263, 266, 92, 95, 86, 592, 597, 187, 188, 30

[56] References Cited

U.S. PATENT DOCUMENTS

| | | | |
|---|---|---|---|
| 4,450,473 | 5/1984 | Van Der Valk | 348/187 |
| 4,731,663 | 3/1988 | Kovalchick et al. | 382/165 |
| 4,790,022 | 12/1988 | Dennis | 382/165 |
| 4,814,859 | 3/1989 | Kimura et al. | 348/30 |
| 5,020,675 | 6/1991 | Cowlin et al. | 209/939 |
| 5,085,325 | 2/1992 | Jones et al. | 382/165 |
| 5,150,199 | 9/1992 | Shoemaker et al. | 348/180 |
| 5,156,278 | 10/1992 | Aaron et al. | 209/586 |
| 5,159,185 | 10/1992 | Lehr | 250/205 |
| 5,206,918 | 4/1993 | Levene | 382/110 |
| 5,432,545 | 7/1995 | Connolly | 209/939 |

*Primary Examiner*—Yon Couso
*Assistant Examiner*—Jayanti K. Patel
*Attorney, Agent, or Firm*—Foley & Lardner

[57] ABSTRACT

A color sorting apparatus has a singulator section, a color sorter and a conveyor which drops the sorted objects into appropriate collection bins. Objects for sorting are transported on an endless conveyor on wheels through the singulation and color sorting section. An independently adjustable speed belt rotates in the same direction as the wheels and operates to provide a view of each of four sides of the object to an imaging device. The imaging device, such as a camera, supplies red, green and blue signals to an image processor which performs a color transformation and obtains a single composite hue value for each object or piece of fruit to be sorted. Based on a comparison of the hue value to user programmed grading criteria, signals are provided to the conveyor so that the objects are ultimately deposited in appropriate sorting bins. The apparatus also provides one or more of color calibration with respect to predetermined color standard references, a dynamic color calibration, a fine tuning adjustment, color correction based on size, shape measurement and a hue value transformation that provides a stable hue value.

2 Claims, 22 Drawing Sheets

METHOD FOR CALIBRATING A COLOR SORTING APPARATUS

This application is a division, of application Ser. Nos. 08/293,431, U.S. Pat. No. 5,533,628 filed Aug. 19, 1994 which is a continuation-in-part of Ser. No. 07/846,236, filed Mar. 6, 1992, U.S. Pat. No. 5,339,963.

BACKGROUND OF THE INVENTION

1. Field of the Invention

The invention is related to an apparatus and method for sorting objects, in particular fruit, by color and shape and for compensating for errors in such sorting systems.

2. Related Art

Numerous attempts have been made to sort items, such as fruit, by color. U.S. Pat. No. 2,881,919 to Bartlett discloses the use of multiple photocells to determine the intensity of light measured from discrete and focused areas of a peach. U.S. Pat. Nos. 3,066,797, 4,454,029, and 3,993,899 disclose sorting machines which use fiber optics to sense different portions of an object and which use light sensors which sense different colors. U.S. Pat. No. 3,770,111 discloses an apple sorter which includes numerous fiber optic cables located around the circumference of an apple. The fiber optic cables are routed to two different color sensors. U.S. Pat. No. Re 29,031 discloses a circuit for sorting apples according to a ratio of colors. U.S. Pat. Nos. 4,057,146 and 4,132,314 disclose sorters which use fiber optic cables and a ratio of colors to sort fruit into two or several color categories. These sorters use photosensitive devices and do not compute the percentage of a certain color.

Vartec Corp. markets an optical inspection system known as Megaspector which uses an image processor implementing gray-scale processing methods. The Vartec processor inspects each individual item in the field of view and determines its acceptability based on user programmed inspection criteria. An article entitled High Speed Machine Vision Inspection for Surface Flaws Textures and Contours by Robert Thomason discloses a system employing an algorithm that processes neighborhood gray-scale values and vector values as implemented in circuit hardware in a distributed processing computer. Thomason discloses that in gray-scale and neighborhood processing techniques, each pixel has a numeric value (64 levels for 6-bit, 256 levels for 8-bit) which represents its gray-scale value. The neighborhood processing compares a pixel with its neighbors and filters out irrelevant information. This transforms each image into another image that highlights desired information. Using low pass filtering, signal to noise ratio can be improved, while high pass filtering enhances the edges of an image. Thomason further discloses a method in which the images are analyzed by high pass filtering to highlight edges and contours and by vector direction at each pixel in order to distinguish edge features from defects on the surface of an object. Pixels in the image are compared to a preprogrammed look-up table, which contains patterns associated with each type of feature.

Automated Inspection/Classification of Fruits and Vegetables by William Miller in The Transactions of the 1987 Citrus Engineering Conference discloses grading requirements and sensor techniques for various sorting approaches. FIG. 3 provides response curves for various optical detectors and FIG. 6 discloses general schematics for different sorting systems.

Automated machine Vision Inspection of Potatoes by Y. Tao, et al. published in 1990 discloses a machine vision system for inspecting potatoes by size, color, shape and blemishes. The system employed methods of using HSI (hue, saturation, and intensity) color scheme and multi-variant discriminate analysis for potato greening classification. Tao discloses a color transformation which reduces color evaluation for red, green and blue stored in three image buffers to one single hue buffer. Hue, H, is calculated by:

$$H=|90°+\tan^{-1}(|2R-G-B|/|\sqrt{3}(G-B)|)+180° \text{ if } G<B||*255/360 \qquad \text{Eqn 1}$$

Tao further discloses that color feature extraction was achieved using a hue histogram which gathers color components and the amount of area of the color in an image. A blue background was used for best contrast between the potato and the background. Tao discloses that it was necessary to use a multi-variant discriminate method for potato classification, since it was difficult to determine a single effective threshold for greening determination. A linear discriminate function was also generated in which the primary procedure was to train the program by samples for the classification criteria and classify a new sample based on the criteria.

Other conventional approaches require obtaining a red-to-green ratio or a mixture of red, green and blue ratios. Clustering, red, green and blue variations, cut by color groups, and trend analysis for grading have also been employed.

U.S. Pat. No. 5,159,185 to Lehr discloses a lighting control system for maintaining a light source and measuring components of a color measurement station in a stabilized condition. A video camera simultaneously measures a test sample and a standard color tile. The system relies on adjusting the lighting by adjusting a fluorescent lamp drive until one of the signals from the standard tile portion of the signal is within a prescribed variation from a reference stored in memory. At that time the test sample is evaluated.

Many of the above color sorters have been of limited use because they requires the operator to identify percentages or other measures of individual colors for sorting purposes. Such methods introduce significant complexity and related errors. The method taught by Tao does not disclose a system which provides an operator the ability to establish separate grading criteria.

SUMMARY AND OBJECTS OF THE INVENTION

In view of the limitations of the related art, it is an object of the invention to provide a color sorting apparatus which sorts based on evaluating images of an entire surface of the fruit;

It is still another object of the invention to sort fruit based on color by obtaining a single hue value from red, green and blue components measured on the fruit;

It is a still further object of the invention to establish a continuous hue spectrum from red to green so that individual values on the spectrum can be selected by a user to differentiate grades of fruit by color;

It is still another object of the invention to compare hue values measured for individual pieces of fruit with the hue values selected on the continuous spectrum by an operator and grade the individual fruit items in accordance with the operator's selected grades;

It is a still further object of the invention to provide a hue value transform which provides a stable hue value with little sensitivity to minor errors, such as quantization errors;

It is another object of the invention to compensate for errors in such sorting systems;

It is a further object of the invention to compensate for totalities of such errors such that individual lanes of objects being sorted are sorted in the same way;

It is a still further object of the invention to provide automatic calibration of a color sorter to color standard references;

It is still another object of the invention to provide a dynamic color calibration of a color sorting system;

It is a still further object of the invention to provide a fine tuning adjustment of such a color sorting system;

It is a still further object of the invention to account for the size of objects in performing color sorting;

It is another object of the invention to provide a system which sorts objects by elongation.

These and other objects of the invention are accomplished by a color sorter which obtains a plurality of images, typically four images, showing various sides of an object as it is rotated in the field of view of an image acquisition device. The image acquisition device, typically a red-green-blue (RGB) camera, provides RGB signals for storage in memory. RGB signals for each image of the plurality of images of an object are transformed to the hue-saturation-intensity (HSI) domain by a processor. Of course, it is possible to implement the invention without storing the RGB values in memory by performing the transformation directly and storing only the HSI representation. A single hue value is obtained for each view of the object. This hue is based on the all the pixel hues for each view of the object. A composite hue value for the object is then obtained, for example by a summing or averaging technique. It would also be possible to obtain a composite RGB value and perform the transformation to obtain the composite hue value from the composite RGB. The composite hue value for an object is then compared to programmed grading criteria to divert objects to collections bins according to the sorting criteria. In addition, the hue value for each view can be further used to compare each view hue value to user-specified grades or categories to further separate objects in more detail. Moreover, the individual view pixels in a certain hue range, for example can be summed and compared to the total pixels to obtain a percentage of a certain hue range. This value can be used to further separate the objects.

A system for sorting objects by color according to the invention includes a camera responsive to an object to be imaged to produce color signals and a processor responsive to the color signals to execute a transformation of the color signals into a hue value for the object. The system also includes a plurality of color standard references representing an anticipated range of colors of the objects to be sorted. Each of the color standard references when imaged produces color signals from the camera. According to the invention, the system also includes a reprogrammable memory to store hue values for the color standard references. A control system is responsive to the hue values of the objects to be sorted to sort said objects into user defined categories. These categories are defined by ranges of hue values around the hue values of the color standard references.

Thus, according to the invention, an apparatus for sorting colored items delivered thereto includes a plurality of color standard references, such as colored balls, spanning a range of colors needed for sorting the items. An imaging device, such as a camera is positioned to receive light from the color standard references and subsequently, during run operations, from the items to be sorted. A color processor receives color standard signals from the camera for each of the color standard references. The color processor also receives color signals for each of said items being sorted. The color processor determines a hue value for each of the color standard references and each of the items according to a predetermined transform. A memory stores the hue value for each of the color standard references. A color sorting system according to the invention also includes processing means for comparing the hue value for each item measured to the stored hue values and categorizing each item into a sorting categories defined by the user using the stored hue values.

A system according to the invention can sort multiple lanes of objects provided to it. An imaging device, such as a camera, can service one or more lanes. Where a plurality of imaging devices is used, the output of the color processor after application of the color transform in response to signals from each imaging device or camera produces the same hue value for the same color standard reference. Thus, a method according to the invention also includes calibrating a plurality of cameras to produce substantially uniform measures of color of imaged objects. This is accomplished by imaging a color standard reference of a same color with each camera and producing color signals from each camera and, in a processor, transforming the color signals produced by each of the cameras in response to the same color standard reference into a single hue value, such that the hue value produced is the same for each said camera imaging said color standard reference. Each camera produces color signals which include signals representing red, green and blue (r, g, b). The r, g, and b signals are transformed into r', g' and b' signals by a constant offset, a, and a gain factor, b. For each camera, k, a set of said constant offset factors for the r, g, b signals ($a_r$, $a_g$, $a_b$) and gain factors for said r, g, b signals ($b_r$, $b_g$, $b_b$) results in the same hue value, H, for each camera. The values are arrived at using an iterative process described further herein.

A system according to the invention also provides a method of dynamically calibrating the color sorting. The method includes imaging a color standard reference ball through a camera and processing signals from the camera to generate a hue value for each of a plurality of views of the color standard references by the camera. The method next includes comparing the hue value to a standard reference hue value and storing a variation of the hue value from the standard reference as a correction value for a corresponding one of each of the plurality of views. During color sorting operations, the systems corrects a hue value measured for an object in each of the plurality of views with the correction value for the corresponding one of each of the plurality of views. In operation, a correction value for an object being sorted having a hue value unequal to the hue value of a color standard reference within one of the views is determined by interpolation of correction values of the closest reference hue values above and below the hue value measured for the object being sorted.

A system according to the invention can also implement in a processor a method of dynamically adjusting color sorting to compensate for size of objects being sorted. The method includes storing in a memory a first reference pixel count for a first reference object size, a second reference pixel count for a second reference size larger than the first reference object size and a third pixel count for a reference object size smaller than the first reference object size. This is followed by measuring a pixel count for one of the objects to be sorted. This measured pixel count is indicative of a size of that object. According to the invention, a hue value correction factor is assigned to the measured hue value of the object being sorted. The hue value correction factor is determined by an interpolation based on a comparison of the measured pixel count with the first, second and third reference pixel counts. The correction is zero if the object being measured has the same pixel count as the first reference pixel count.

The correction results in a corrected hue value which exceeds the measured hue value when the pixel count measured for the object being sorted exceeds the first reference pixel count. The correction results in a corrected hue value which is less than the measured hue value when the pixel count measured for the object being sorted is below the first reference pixel count.

A system according to the invention also provides a method of sorting objects by degrees of elongation. Elongation sorting is accomplished by imaging an object and obtaining a pixel count for at least its height and one diameter sample of the object. A ratio of the pixel counts of the height and the diameter sample is obtained and the objects are sorted into desired categories defined by predetermined ranges of the ratios.

In a image sorting system according to the invention, a method of compensating for over-rotation of objects being sorted is also provided. The method involves passing an object to be sorted through an imaging area covered by a camera and rotating the object to obtain a plurality of views of the object in the imaging area. From a diameter of the object it is determined if during its rotation in the imagining area, the object will rotate more than a predetermined number of rotations. Signals produced by the camera imaging the object when the number of rotations of the object exceeds the predetermined number of rotations are disregarded. According to the invention, this compensation can be achieved based on the length of travel of the object. Where the imaging area covers a length of travel of the object, the signals are disregarded in an portion of the length of travel exceeding a predetermined distance of the length of travel. This predetermined length is determined from the a diameter of the object and a predetermined factor. The predetermined length, L, equals said diameter times pi times the predetermined factor. The predetermined factor is a function of friction, object size and rotation speed and in a fruit sorter according to the invention has been determined to be about 1.0/0.8

An apparatus for sorting objects by color according to the invention also includes a color sorting section having means, such as a color transformer, for determining a hue value of each object to be sorted and for sorting the objects according to the hue value. The hue value is a quantized measure extracted from a transformation to provide a predetermined continuous range of hue values in the object. The means for determining the hue value also performs a further transformation to provide a stable hue value under predetermined circumstances. According to the invention this hue value is a function of an angle defined by a predetermined relationship of red, green and blue signals from an imaging device, such as a camera. According to the invention, the further transformation shifts an axis according to angles of each position on a plane, such that said hue value is determined from a position on a line defining the angle. This position is substantially insensitive to errors to thereby generate a stable hue value. This further transformation produces a hue value, h', defined as:

$$h' = \left[ \left( \tan^{-1} \frac{V_2}{V_1 + \chi} \right) * \left( \frac{Q_1 - \alpha}{Q_1} \right) + \alpha \right] * \frac{255}{360}$$

where $$\chi = \chi_0 - \frac{Q - Q_0}{(Q_1 - Q_0)\gamma_0}$$

Q=the angle of the position on the UV or $V_2V_1$ plane
$Q_0$=constant $0 \leqq \pi$
$Q_1$=constant $0 \leqq \pi$
$\gamma_0$=constant $-255 \leqq \gamma_0 \leqq 255$
$\chi_0$=constant $-255 \leqq \chi_0 \leqq 255$
$\alpha$=offset $-\pi \leqq \alpha \leqq \pi$

BRIEF DESCRIPTION OF THE DRAWINGS

The above objects of the invention are accomplished by the apparatus and method described below with reference to the drawings in which.

DETAILED DESCRIPTION OF THE PREFERRED EMBODIMENTS

Figure 1:
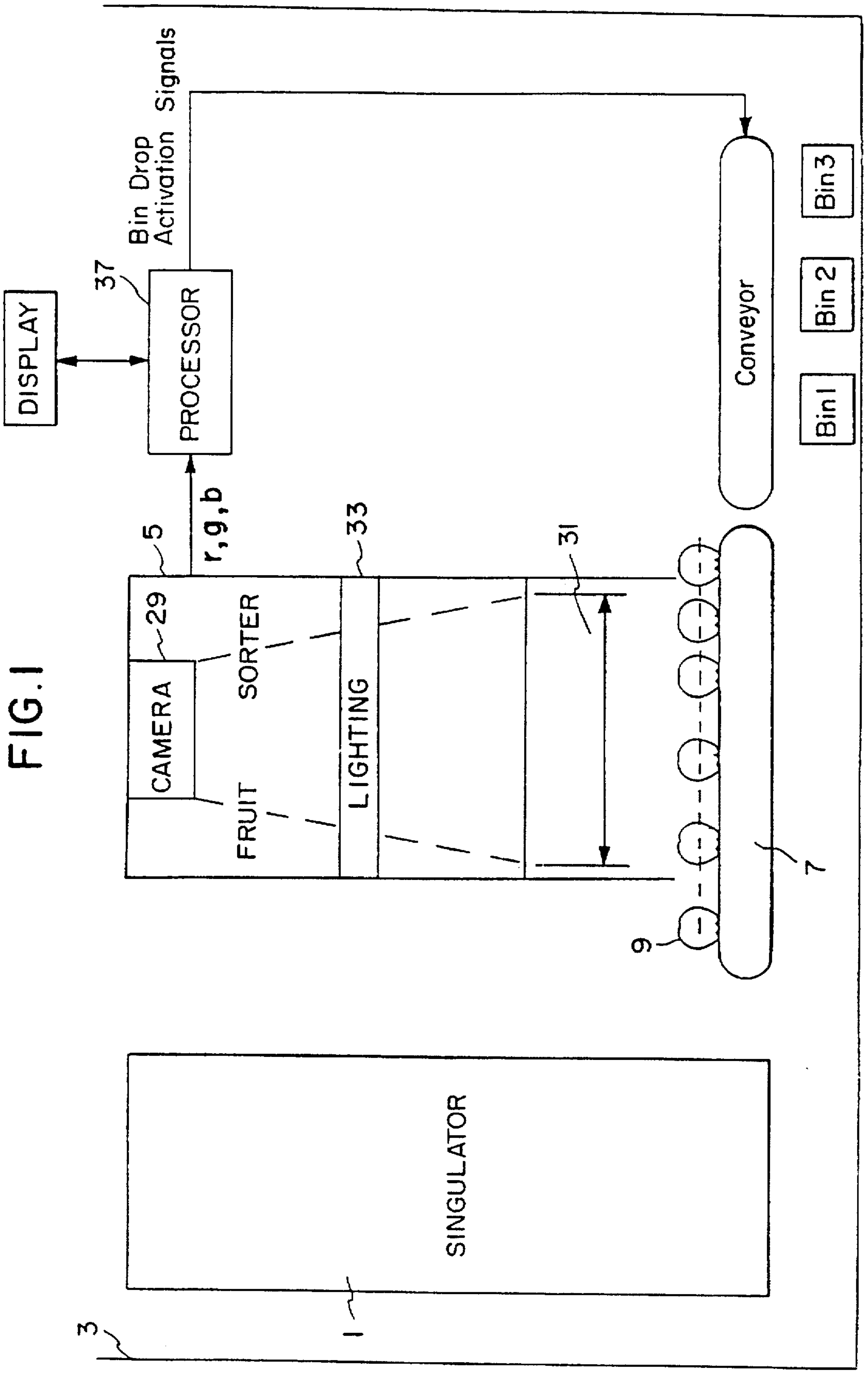
FIG. 1 is a block diagram of a fruit sorting system employing the color sorter of the invention.

As illustrated in FIG. 1, a color sorting apparatus receives lanes of objects in single file, for example fruit, from a singulation section 1 of a fruit sorting device 3. The color sorting apparatus 5 determines a hue value for each object or piece of fruit received and sorts the objects according to the hue value. The fruit or other objects to be sorted are rotated through 360 degrees so that a complete view of all sides of the object can be obtained. One way of rotating fruit or other objects is to employ an independently adjustable speed belt 7 that contacts wheels 9 on which the fruit travels in the color sorting apparatus 5. The belt drives the wheels at a rate to cause a complete, progressive rotation of each fruit item contacting the wheels as it passes through the color sorting section. A composite hue value is determined for each individual item after the hue value has been obtained for each of a plurality of hues, typically four views. The composite hue value is compared to a reference on a continuous spectrum, e.g., from red to green, on which different hue values represent different grades for sorting purposes.

The color sorting apparatus 5 has fluorescent lighting 33 which can be selected to emit selected wavelengths known to enhance colors of particular objects. The fluorescent lighting is positioned to illuminate the objects to be sorted. A red-green-blue camera 29 is positioned to obtain images of the objects to be sorted. The camera produces red, green and blue signals for each view of each object imaged. A processor 37 receives the red, green and blue signals from the camera. The processor has a color transformer to execute a transform on the red, green and blue signals and arrive at a hue value on a continuous scale of hue values for hues known to exist in the particular fruit. Thus, for apples, a continuous scale of red to green hues would typically be employed.

Figure 2:
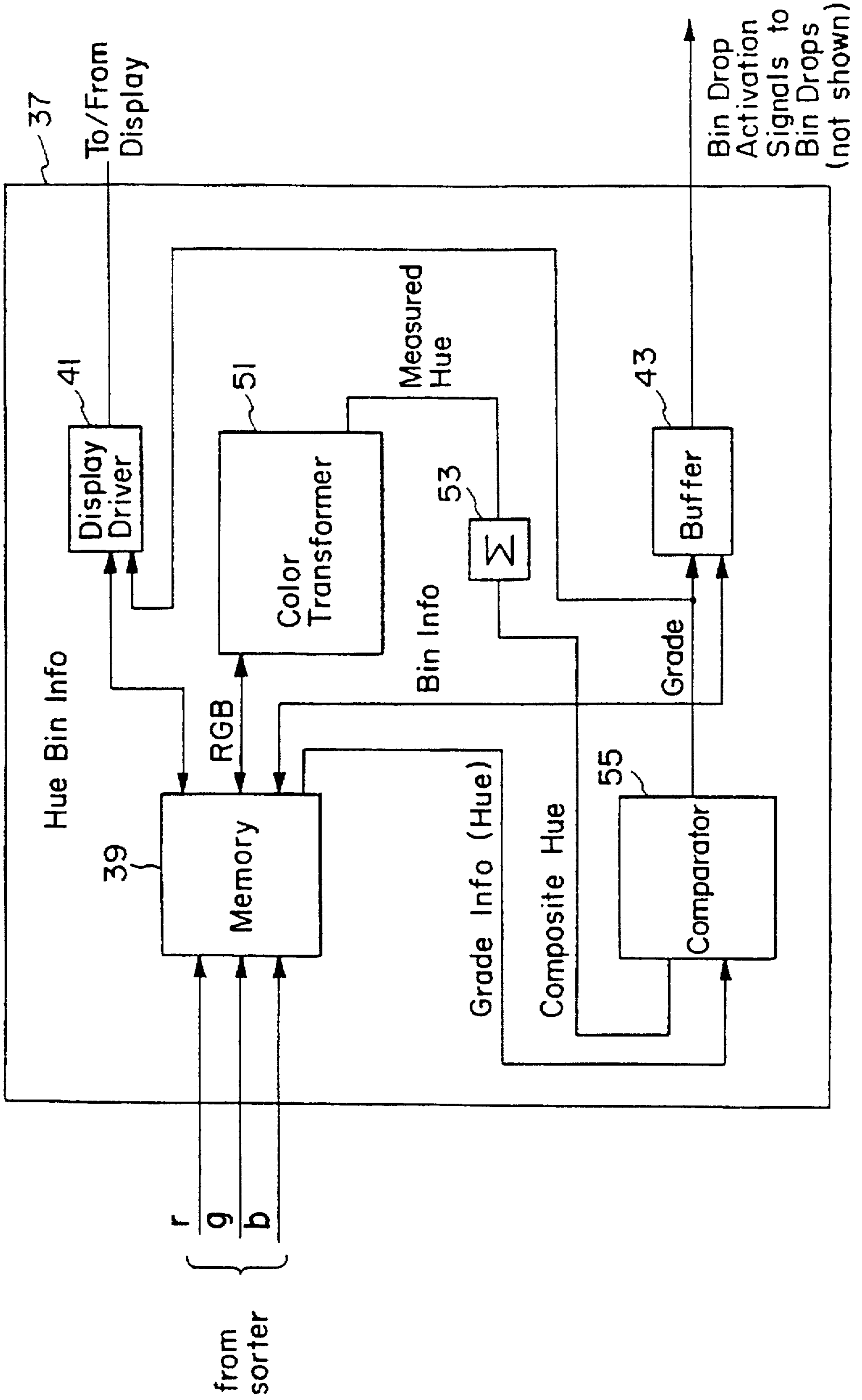
FIG. 2 is a block diagram of an image processor according to the invention.

Memory 39 in FIG. 2 stores a programmed grading scale of hue values. A comparator 55 receives hue signals representing hue values for each object from the color transformer and compares the hue values to the hue values stored in the grading scale, thereby classifying an object into a grade on the scale. It should be noted that the color transformer and comparator can be implemented in hardware or software or any combination thereof, as convenient for the application. In addition, it would be possible to collect and store red, green and blue signals for each of the views, develop a composite red, green and blue signal for the items to be sorted, and command the color transformer to execute the transform on the composite red, green and blue signals to arrive at a hue value.

In addition, the system can easily be programmed such that the hue value for each view can be further used to compare each view hue value to user-specified grades or categories to further separate objects in more detail, e.g., color consistency control. Moreover, the individual view pixels in a certain hue range, for example, the red range, can be summed and compared to the total number of counted pixels to obtain a percentage of a certain hue range. For example, if an object is 50% red and 50% green, 50% of the total pixels will be counted as red. Thus, the system can determine that 50% of the object is red. This percentage value can be compared to grade or hue percentage which is specified by the user to further separate the objects. The system also compares the hue value or shade or intensity of the color against values defined by the user for various grades.

Figure 4:
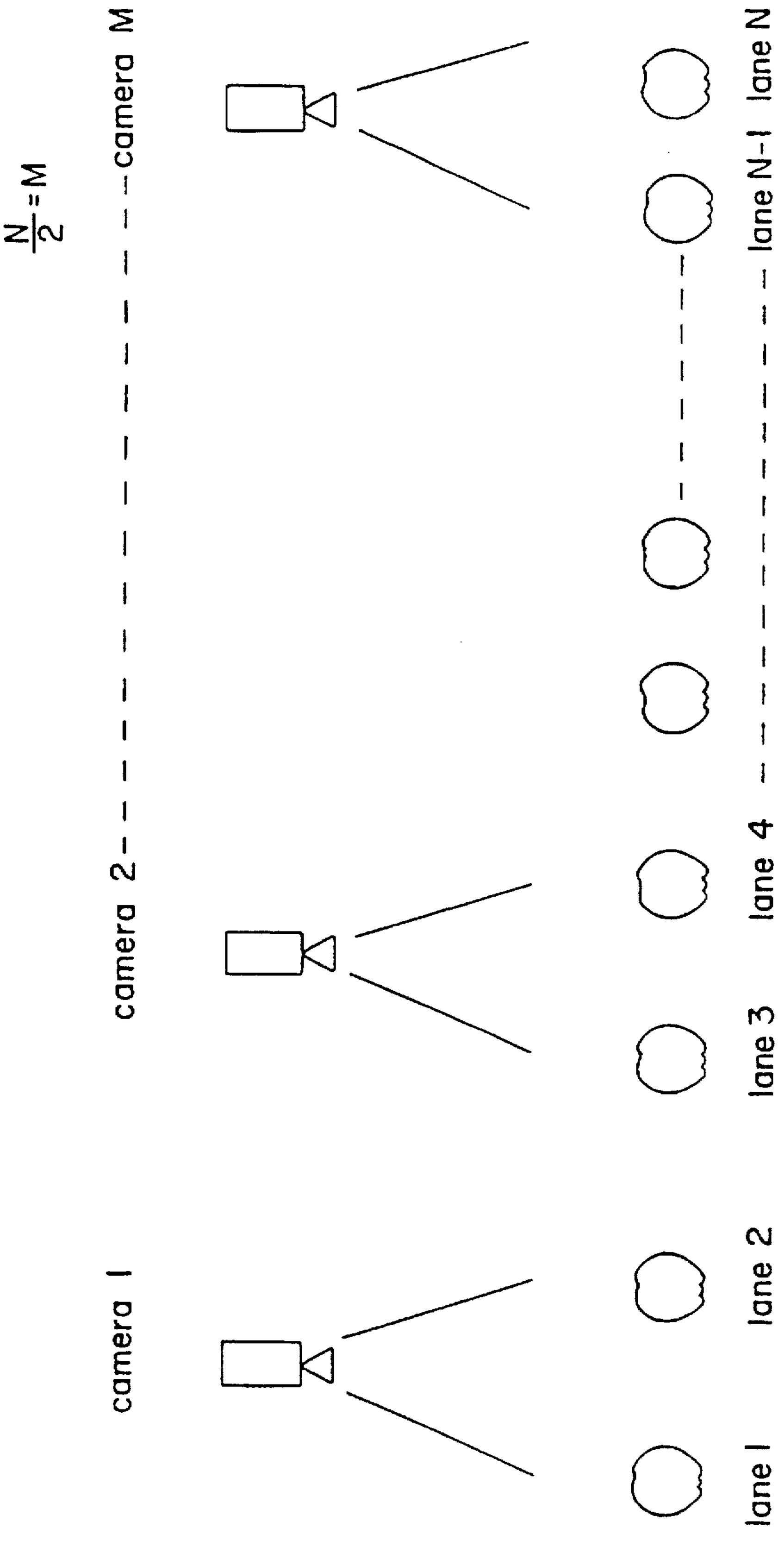
FIG. 4 illustrates cameras, each covering two lanes of fruit.
Figure 5:
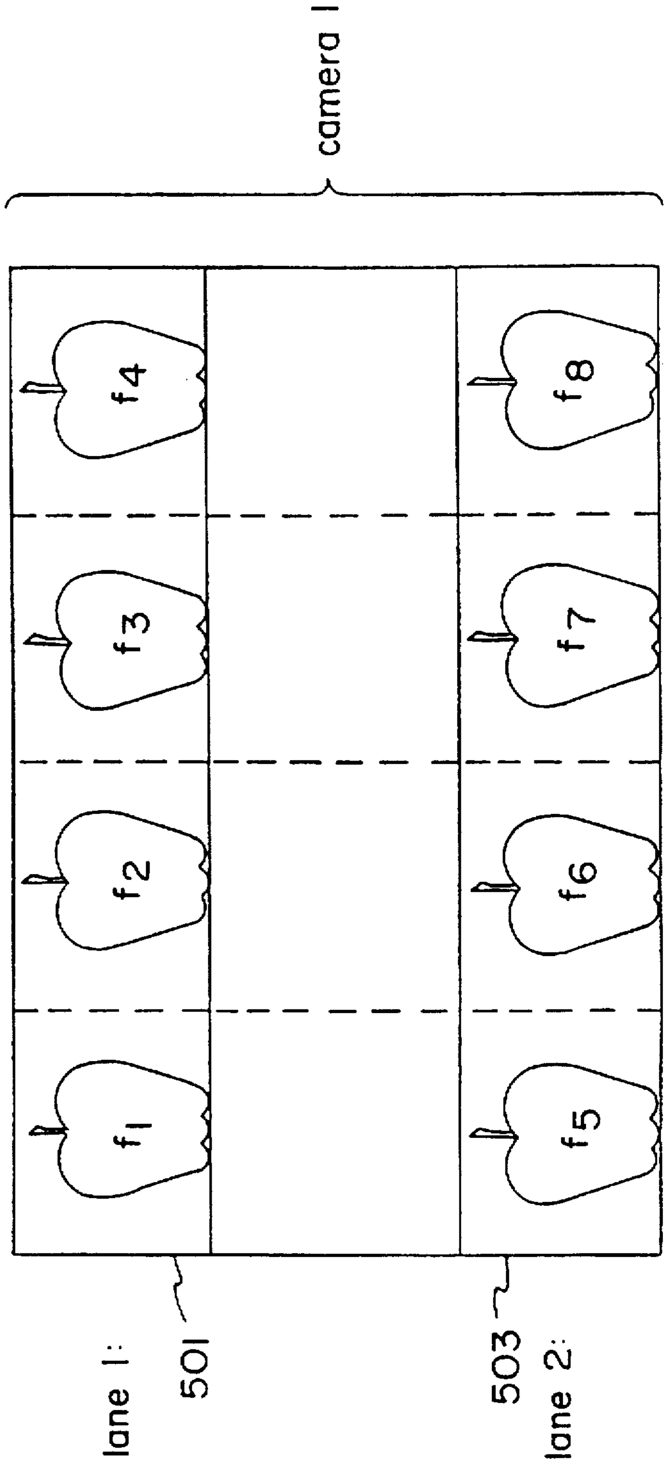
FIG. 5 illustrates a typical two lane image obtained by the invention.

In a preferred embodiment, the camera is synchronously activated to obtain images of four pieces of fruit in each of two lanes simultaneously. FIG. 5 illustrates the image seen by a camera 29 having a field of view that covers two lanes 501, 503. FIG. 4 illustrates a plurality of M lanes covered by N cameras, where N=M/2. Thus, 16 lanes of fruit would be covered by 8 cameras, each camera having a field of view of two lanes. Those of ordinary skill will recognize that this is a limitation of the camera equipment and not the invention and that coverage of any number of lanes by any number of cameras having the needed capability is within the scope of the claimed invention.

Figure 6:
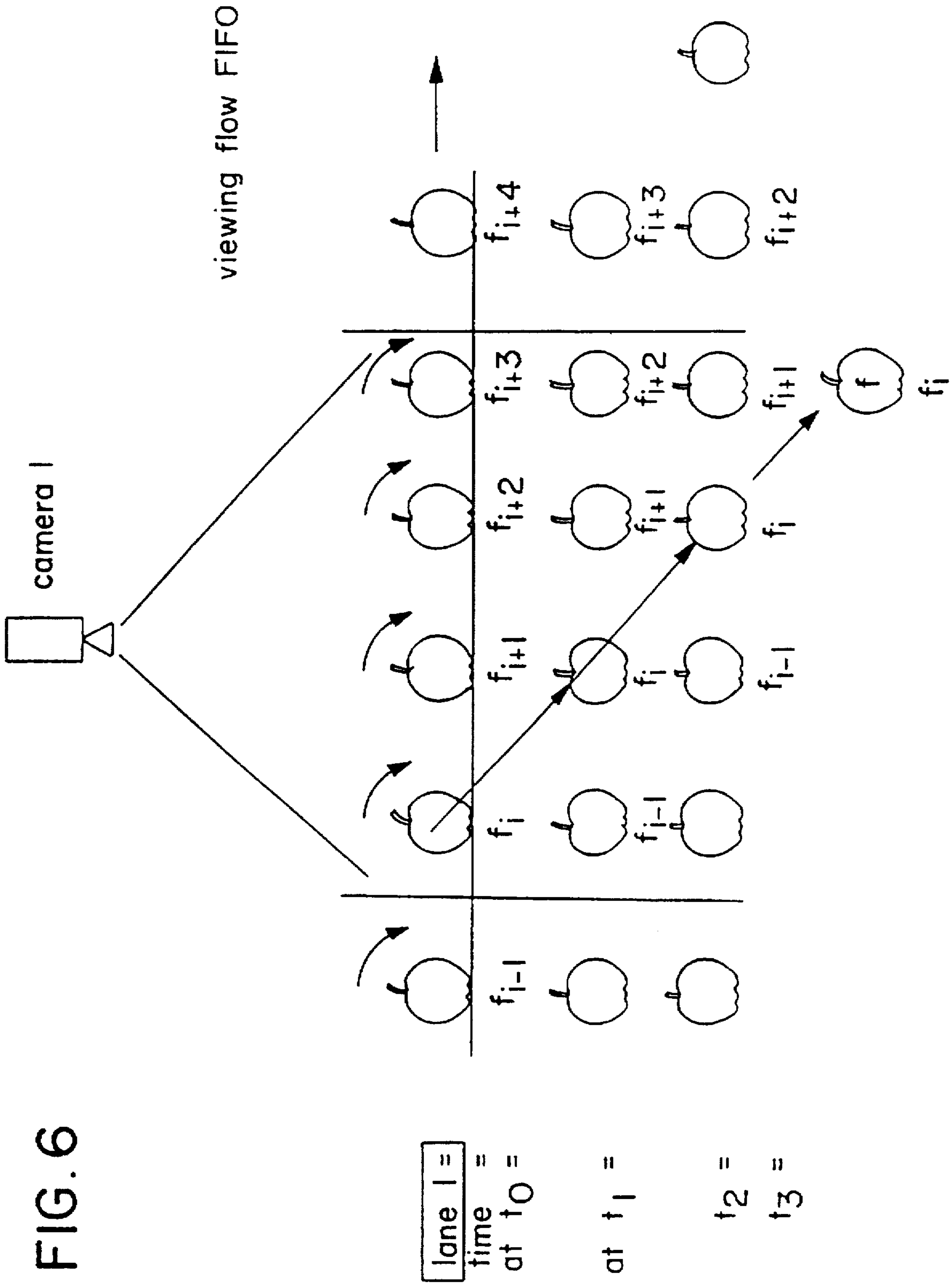
FIG. 6 illustrates the progress of a piece of fruit through the sorter.

FIG. 6 illustrates the progress of fruit as it rotates through four positions in the sorter. FIG. 6 represents the four positions of a piece of fruit $f_i$ in the four time instants from $t_0$ to $t_3$. Thus, four views of each piece of fruit are obtained. Synchronous operation allows the color transformer to route the red, green and blue signals and to correlate calculated hue values with individual pieces of fruit. Synchronous operation can be achieved by an event triggering scheme. In this approach any known event, such as the passage of a piece of fruit or other object past a reference point can be used to determine when four pieces of fruit are in the field of view of the camera.

Within sorting apparatus 5 are located lighting elements 33. These are typically fluorescent lighting elements which operate unmodulated between 20 KHz and 27 KHz, thus eliminating the effects of 60 Hz line frequencies. Fluorescent lighting provides good illumination of the fruit to be sorted. A plurality of fluorescent lights can be employed with each enhancing a different color of the spectrum, as appropriate to the application. Thus, apples known as Delicious might be exposed to lights which enhance a red spectrum while green apples would be exposed to lights enhancing a different spectrum.

Figure 3:
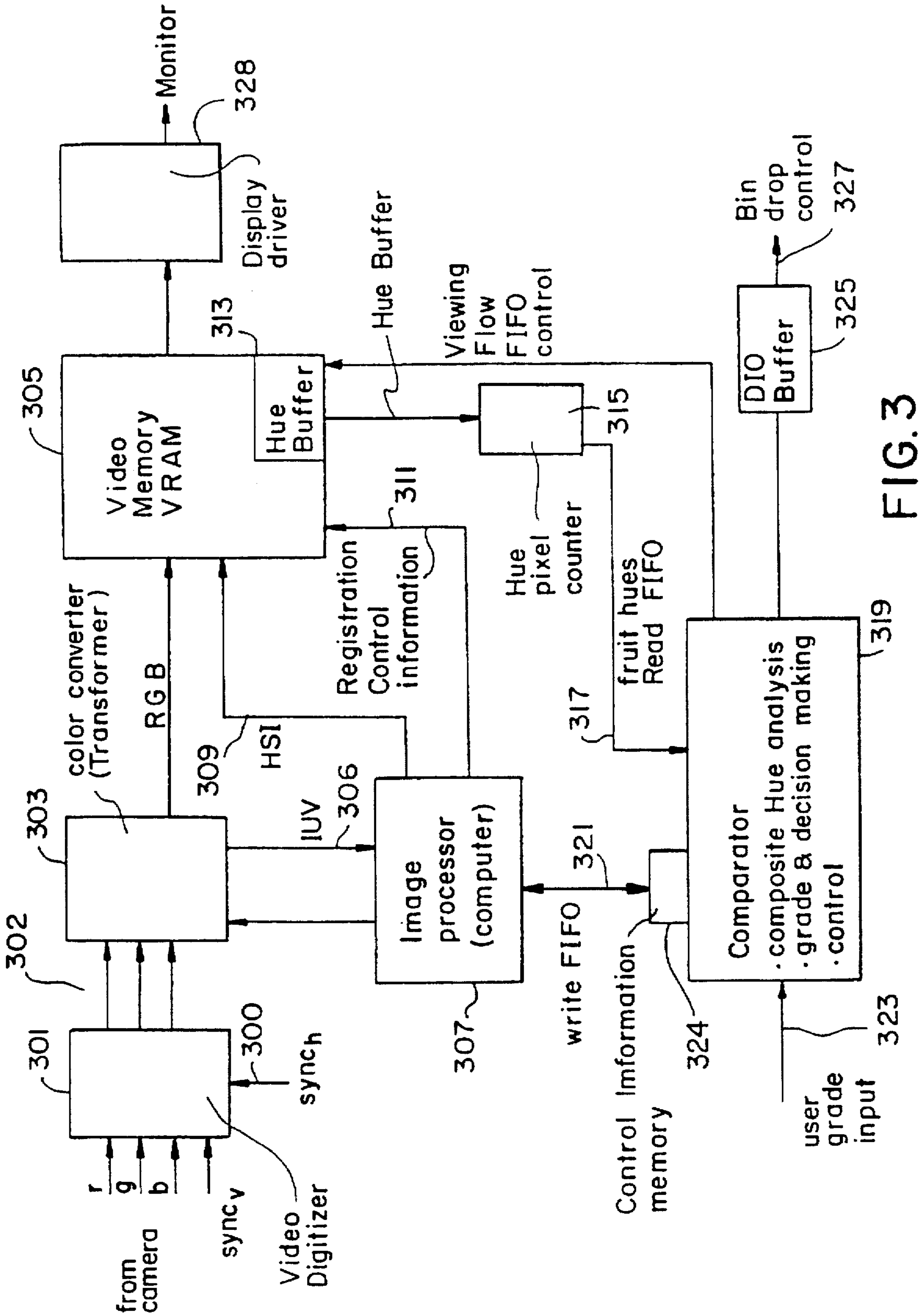
FIG. 3 is a more detailed block diagram of the image processing equipment.

A more detailed block diagram is illustrated in FIG. 3. Responding to a sync signal on signal line 300, a video digitizer receives red, green and blue signals from camera 29 and transmits the digitized signals over signal lines 302 to color converter or transformer 303. The RGB signals are provided from color transformer 303 over signal lines 304 to video random access memory 305. Color transformer 303 transmits intensity, hue and saturation information in the form of signals I, U, V, over signal lines 306 to image processor 307. Image processor 307 transmits signals converted to HSI format to video RAM 305 over signal lines 309. The image processor also provides registration control information to video RAM 305 over signal lines 311 so that the proper signals are associated with the corresponding fruit images. Using the control information, video RAM 305 stores hue data in hue buffer 313 and transmits the hue information to a hue pixel counter 315 at the appropriate time. The hue pixel counter counts the number of pixels of each hue and provides the hue information over signal lines 317 in a first-in first-out (FIFO) format to comparator 319. Comparator 319 communicates with image processor 307 over bidirectional signal line 321 to obtain control and other information and to provide the measured and calculated hue data, also in a FIFO format. User grading input data is provided to the comparator over signal lines 323 and stored in a separate memory 324. The comparator 319 performs analysis of a composite hue value obtained from a combination of hue values for each of the sides of the fruit imaged and compares the composite value to the user provided grading criteria. Based on this comparison, the comparator identifies a grade for each piece of fruit and DIO buffer 325 generates the corresponding bin drop signals 327. The output from the comparator can also be provided to the display driver 328 directly or through video RAM 305 for display to the operator.

Figure 10:
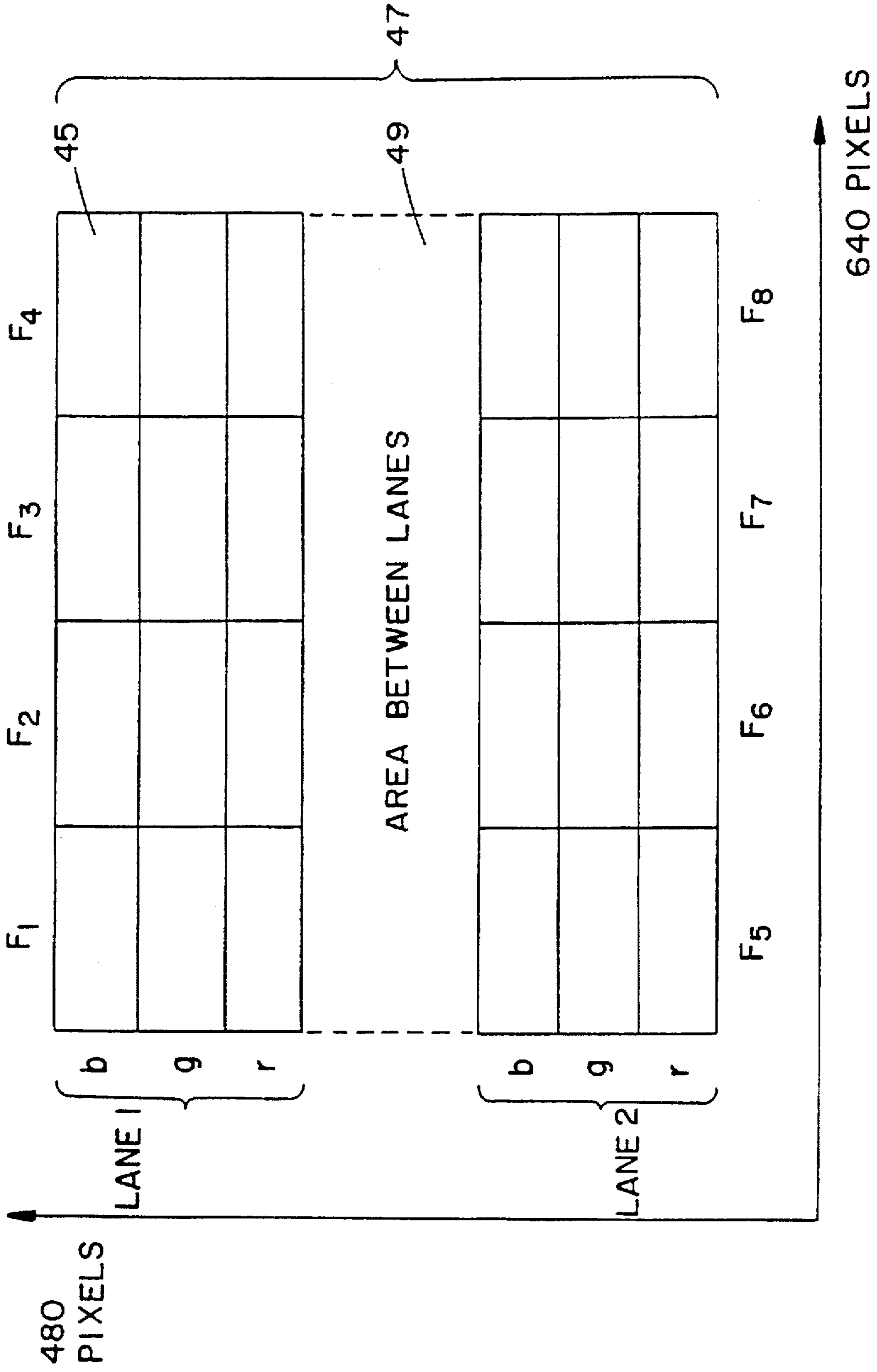
FIG. 10 illustrates a possible arrangement of pixels.

FIG. 10 illustrates a possible pixel image obtained in a two lane field of view by camera 29. As shown in FIG. 10, an image of approximately 640 pixels by 240 pixels is obtained. Red, green and blue signals are obtained for each piece of fruit $F_1$–$F_8$ in the field of view. Approximately 12,000 or more pixels can be found in any one section 45 of the matrix 47. A minimum number of pixels in each section 45 of the matrix must be detected to overcome a noise threshold. It should be noted that area 49 between lanes 1 and 2 would be expected to result in no detections above noise, since no fruit is present in this area and the components are colored blue. Numbers of red, green and blue pixels can be stored in memory 39 as digital words using known techniques. Red-green-blue signals are provided to color transformer 51 in image processor 37. Color transformer 51 can be implemented in hardware or software, as convenient. Color transformer 51 executes a color transform. Alternatively, the color transformation can be performed on the RGB signals prior to storage and only the HSI representation stored. As previously discussed, one possible transform was disclosed by Tao et al., as shown in equation 1 herein. As previously discussed, this transformation reduces color evaluation from three image buffers to one single hue buffer. A different transform is employed in the present invention, as shown in Eqn. 2 below.

Figure 7A:
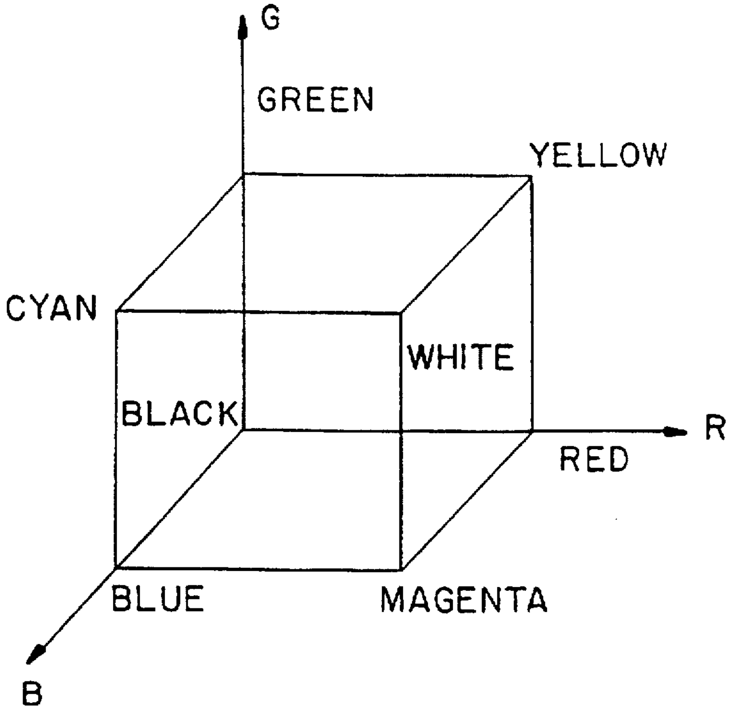
FIGS. 7*a* and 7*b* illustrate the axes in the RGB plane and HSI transform, respectively.
Figure 7B:
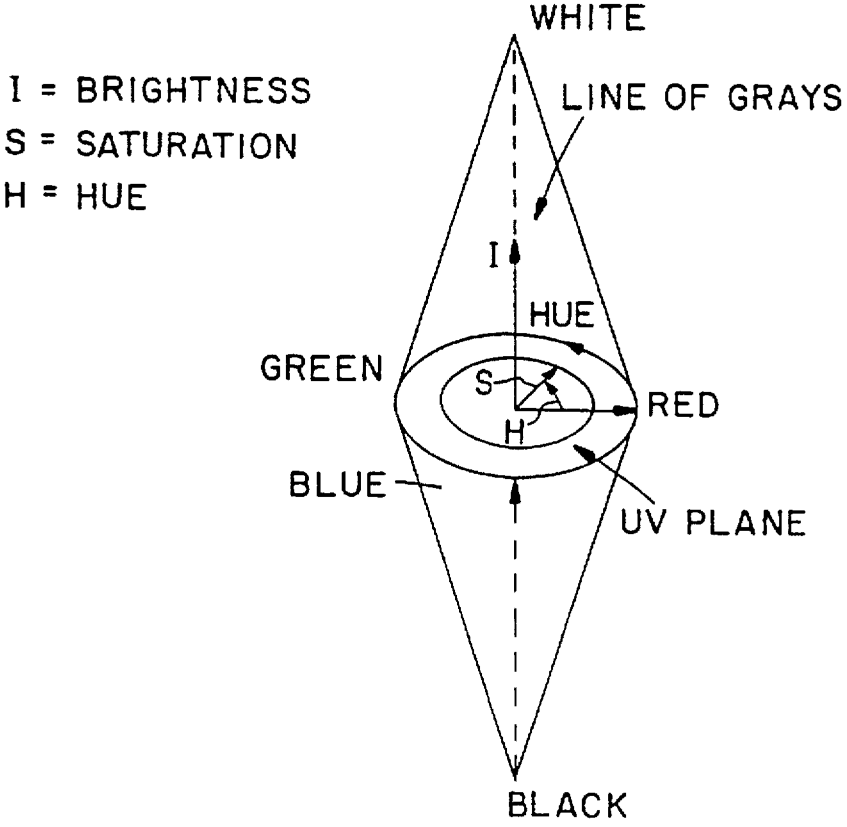
Figure 7C:
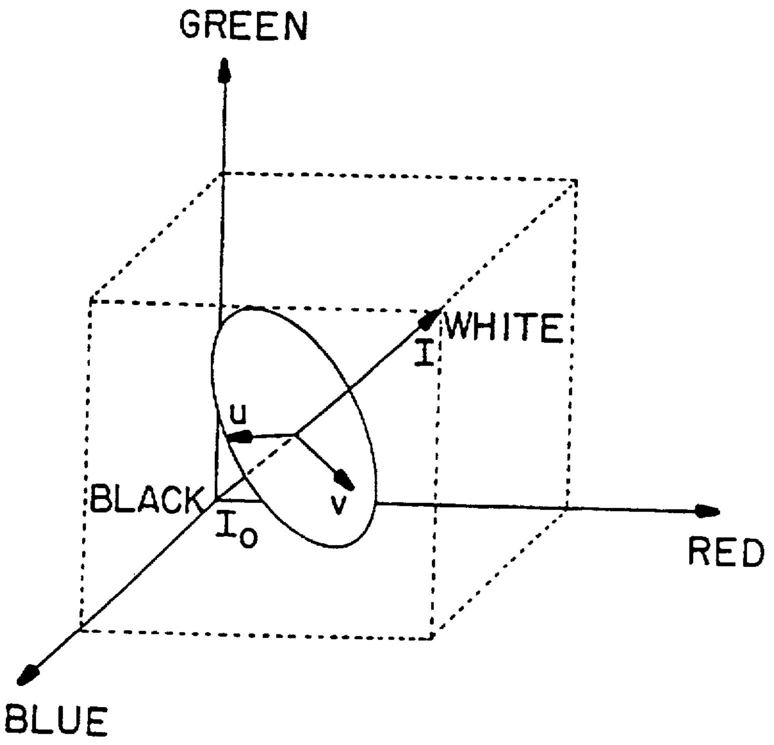
FIG. 7*c* illustrates the relationship between the RGB and HSI representations.

FIGS. 7*a*–7*c* illustrate the relationship between the RGB representation and the HSI (Hue, Saturation, Intensity) representations in general. As shown in FIG. 7*c*, the HSI representation can be mapped on to the RGB plane.

Figure 9A:
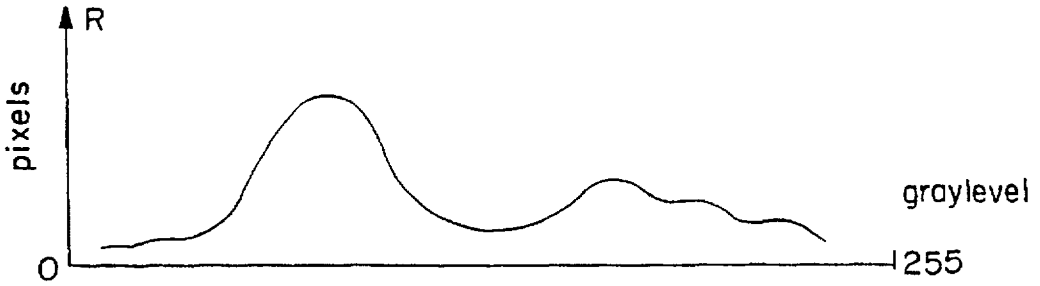
FIGS. 9*a*–9*d* illustrate levels of RGB and hue, respectively, on a continuous spectrum.
Figure 9B:
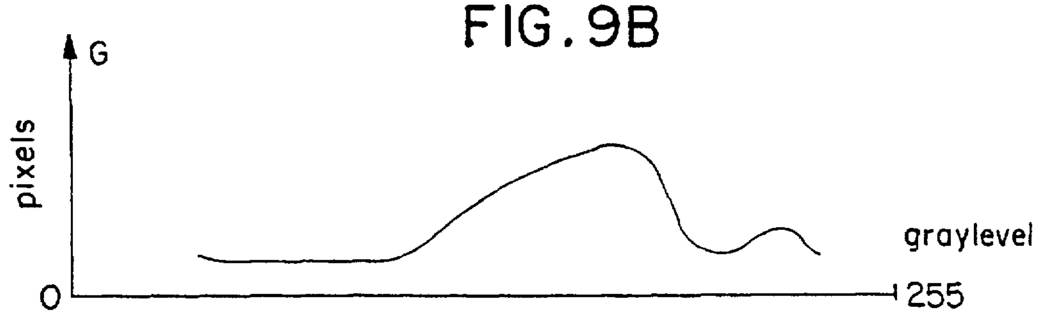
Figure 9C:
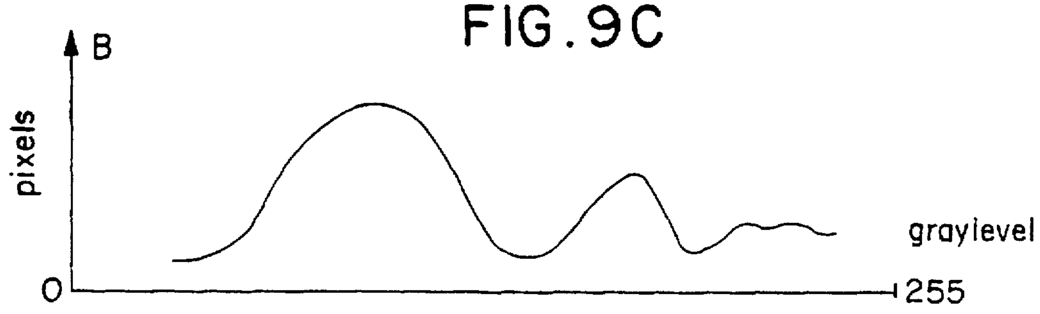
Figure 9D:
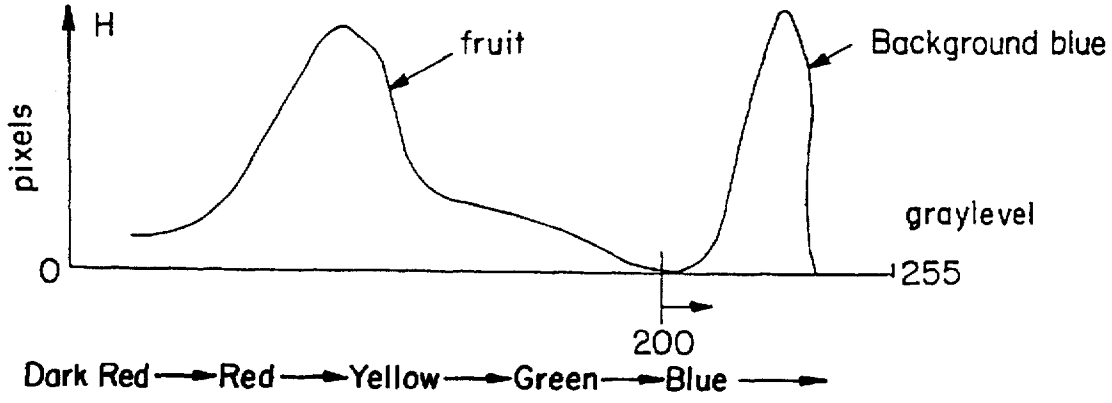

FIGS. 9*a*–9*c* illustrates the number of pixels of red, green, blue in an example measurement provided by camera 29. FIG. 9*d* illustrates the transformation to a single hue measurement from the red, green, blue representation in accordance with the following equations:

$$H_1=\tan^{-1}\{(R-2G)/(3B-R-G)\}\times 255/360$$

$$H_2=\tan^{-1}\{(2R-2G)/(6B-2R-G)\}\times 255/360 \qquad \text{Eqn. 2}$$

These equations are defined to enhance the color-spectrum range needed to obtain the optimum color discrimination for the particular objects being sorted. The equations are also defined to match the spectrum of lighting being used by the system. In the illustrated exemplary equations set forth above, the equation Hi is used to enhance the red range on red delicious apples and H2 is used to enhance the yellow-green range on golden delicious apples. The normalization factor (255/360) is based upon an 8 bit storage and will vary with the bit size of the storage.

As shown in FIG. 9*d*, a continuous spectrum is obtained from dark red to light red to yellow to green to blue. Blue is selected as a background color for fruit processing, since no known fruits of interest are predominantly blue. Therefore, in processing, blue is simply filtered out. The fruit is then evaluated based on the spectrum as shown in the red, yellow and green portions of the spectrum in FIG. 9*d*.

A fruit has approximately 12,000 or more pixel hues on each side depending on the sizes of the objects being sorted. After applying equation 2 and determining the predominant or individual hue values for each of, for example, four images of each object to be sorted, the appropriate measured hues are summed or averaged in summation device 53 and a composite hue value is provided to comparator 55. An individual hue value for each view and a hue range percentage for the multiple views can be calculated. These values are used as additional criteria for which to separate objects through comparator 55.

Since a single composite hue value is available, it is possible for an operator to program into memory 39, or preferably memory 324, grades based on a continuous spectrum of hue. Typically, a piece of fruit, such as an apple, is graded on its red color along with variations of green. Thus, a continuous red to green spectrum is selected and blue is filtered out, as previously discussed. Using the grade information from memory, comparator 319 in FIG. 3 (or 55 in FIG. 2) identifies a grade for each individual piece of fruit. This grade information can be provided to display driver 328 in FIG. 3 (or 41 in FIG. 2), if desired, and to buffer 325 (or 43 in FIG. 2) which provides bin drop activation signals causing a second conveyor to drop the fruit into the correct bin. Buffer 325 receives bin information from memory 321, while buffer 43 is shown receiving the bin information from memory 39. As previously discussed, bin drop activation signals can be generated in other known ways.

As the fruit or other objects exit the color sorting apparatus, they are transferred to a conveyor. In response to the bin drop activation signals, the objects conveyed are deposited in the proper collection bins.

Figure 8:
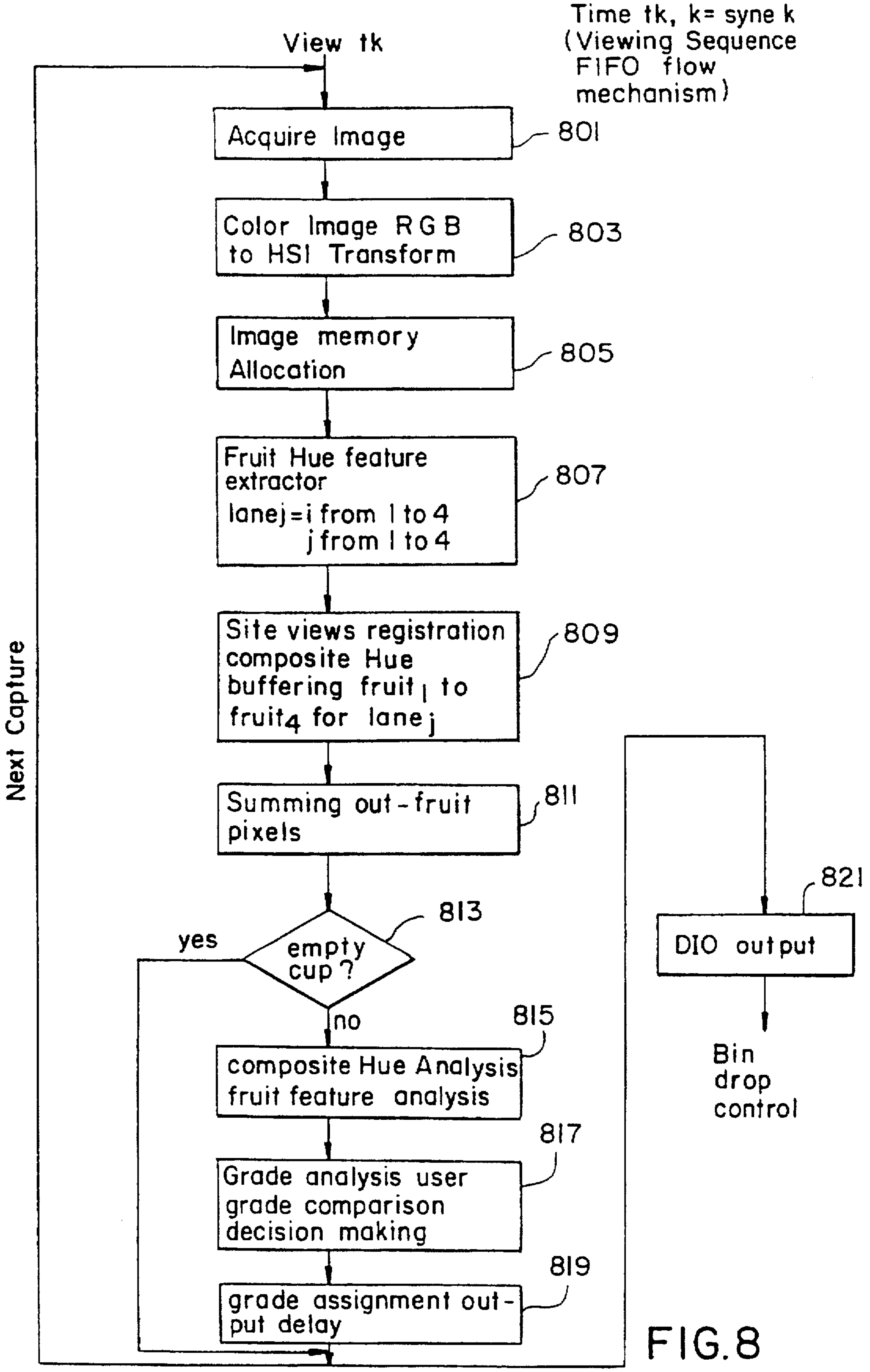
FIG. 8 is a flow diagram showing the steps in performing a color sorting operation.

FIG. 8 is a flow diagram illustrating the preferred method of the invention. At step 801 an image is acquired by camera 29 in response to a synchronization signal. RGB signals are then transmitted to the color transformer 303 where, in step 803 the transform to HSI representation is performed, using equation 2. At step 805 the image is allocated to memory. As previously noted, at any one time four pieces of fruit are in the field of view of camera 29 in each lane. In step 807, for fruit, i, in lane, j, the features are extracted. Registration of the fruits images and composite hue buffering for the fruits needed to obtain a obtain a composite hue value for each piece of fruit takes place in step 809. In step 811, summing of the pixels is performed to obtain the composite hue values.

At step 813 it is determined if a fruit was detected or if the cup carrying the fruit was empty. If the cup was empty the remaining steps 815–819 are skipped for this cup. If an object was detected, based on the number of pixels measured, in step 815 a composite hue and fruit feature analysis is performed preliminary to grading the fruit to establish the characteristics of the fruit that will be compared with user grading criteria. In step 817, the user programmed grading information is compared with the results of the hue and feature analysis in step 815 and a grading decision is made based on the results of the comparison. Grade assignment is made in step 819 and the output signal delayed so that in step 821 Bin output signals can be generated to control dropping of the fruit into the correct collection bins via drop control signals.

One feature according to the invention is a variable angular density hue transformation that increases both color distinguishability and transform stability. As shown in Equation 2 above, hue is defined to be an angle calculated as the arctangent of a fraction. As the fraction's denominator, (3B-R-G) for $H_1$ and (6B-2R-G) for $H_2$, becomes small, the value of the fraction varies widely with small changes in the numerator. Wide variations in the value of the fraction produce wide changes in angle and hence in the hue values. This problem is compounded by the discrete and discontinuous nature of digital representation of the numerator and denominator values (i.e., the denominator value can be "1" or "2" but not "1.5").

FIG. 11 illustrates how the calculated hue value can become unstable by its sensitivity to minor variations in the numerator in, for instance, the dark red region in the lower portion of the first quadrant of the UV plane, where U represents the numerator and V represents the denominator of the hue value equation. Such variations can result from slight changes in light, camera voltage, or from quantization errors. For example, assume U and V can take on values between 0 and 255. For a low value of V such as 1, a change in the value of U from 1 to 2 as a result of quantization error changes angle substantially, as reflected in lines 1101 and 1102 in FIG. 11 and in the hue value equation changing from taking the arctan (1) to the arctan (2). Thus, at low values of V, points corresponding to various hue values are very dense and the hue value tends to be unstable due to its sensitivity to minor changes.

Figure 11A:
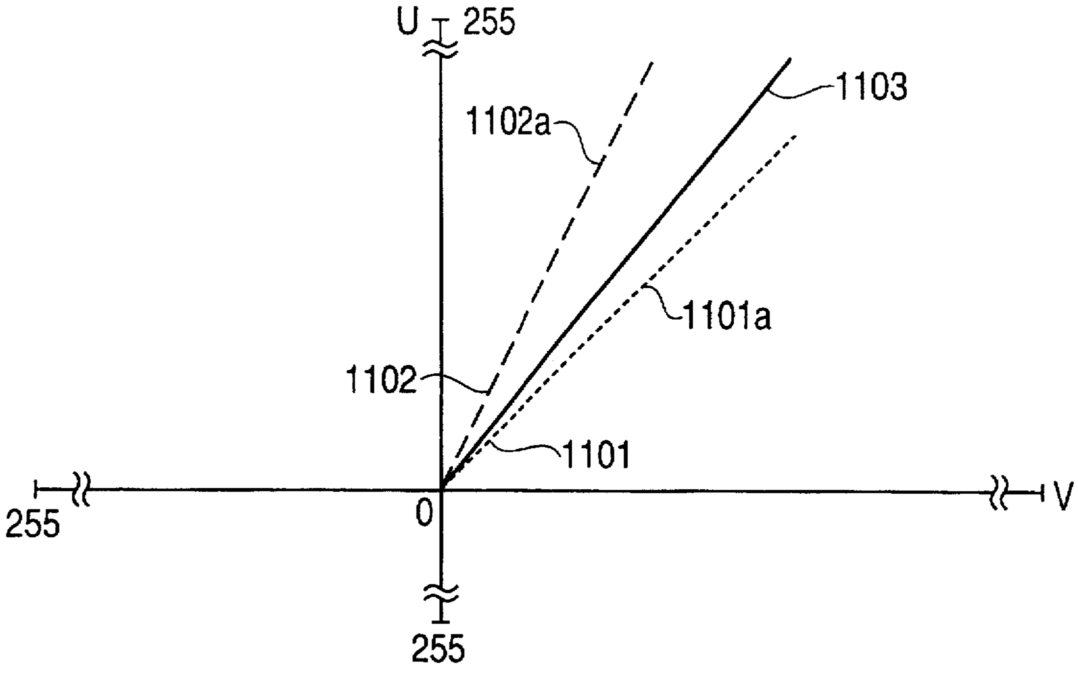
FIGS. 11*a* and 11*b* illustrate a shift of coordinate axes used to achieve a variable angular density hue transformation.

In Figure 11*a* each line 1101 and 1102 defines a hue value by its angle. As points on a line are located further from the origin, there is less sensitivity to small variations in the numerator. For example, when V is 5 and U is 5, as in extended line 1101*a*, a 1 bit quantization error in U results in a significantly smaller variation in hue value, as shown by line 1103. The effect is further reduced as the values of U and V get larger. Since each point on the extensions 1101*a* and 1102*a* of each of lines 1101 and 1102 represents the same hue value, the above illustrates that a transformation can be performed to reduce the error sensitivity and thereby improve the stability of the hue value.

Figure 11B:
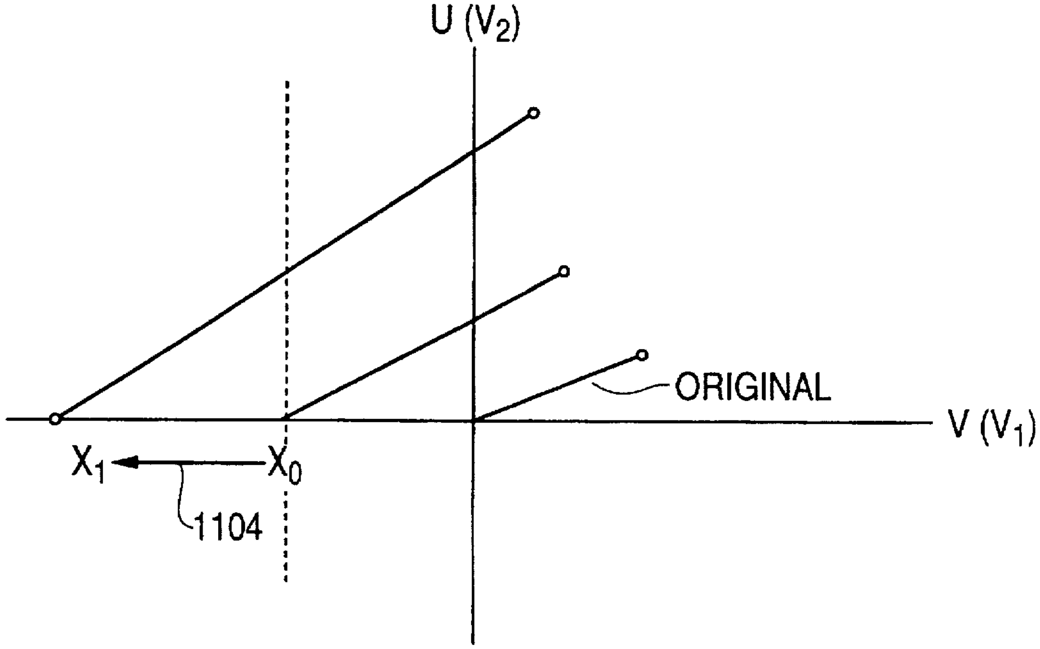

According to the invention, the transformation performed, for example in color transformer 303 in FIG. 3, when calculating the hue value under such circumstances shifts the origin along the V axis according to the angles of each position of the UV plane. The origin is shifted to a point X by first shifting the origin to $X_0$ for a value of U=255 and, while rotating through decreasing values of U, shifting the axis in the direction shown by arrow 1104 in FIG. 11*b* until U is zero. The amount of the shift at U=0 defines point $X_1$ as shown in FIG. 11*b*. The mathematical representation of this transformation according to the invention is given as:

$$h' = \left[\left(\tan^{-1}\frac{V_2}{V_1+\chi}\right)*\left(\frac{Q_1-\alpha}{Q_1}\right)+\alpha\right]*\frac{255}{360}$$

where $$\chi = \chi_0 - \frac{Q-Q_0}{(Q_1-Q_0)\gamma_0}$$

Q=the angle of the position on the UV or $V_2V_1$ plane
$Q_0$=constant $0 \leqq \pi$
$Q_1$=constant $0 \leqq \pi$
$\gamma_0$=constant $-255 \leqq \gamma_0 \leqq 255$
$\chi_0$=constant $-255 \leqq \chi_0 \leqq 255$
α=offset $-\pi \leqq \alpha \leqq \pi$ As a result of performing the transformation according to the invention, in the first quadrant a larger radius is available to calculate hue value with correspondingly less sensitivity to small errors, such as quantization errors, and greater hue value stability.

This is because the offset expands the available space from Q-α from less than π/2 space to π/2 space.

Figure 12:
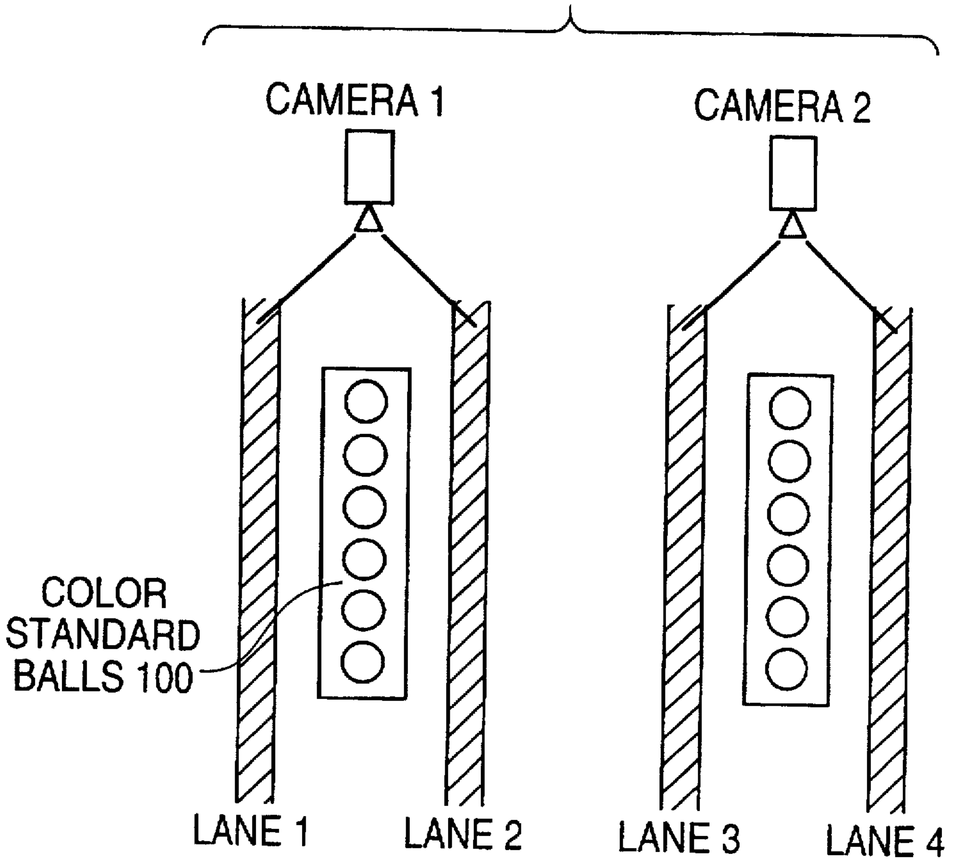
FIG. 12 illustrates the preferred placement of color standard balls for camera calibration.
Figure 13A:
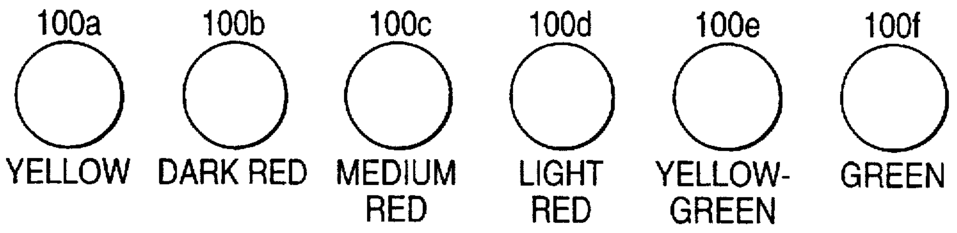
FIG. 13*a* illustrates a possible set of color standard balls.

Another feature of the invention is a camera color calibration scheme. The first part of this scheme is termed "automatic camera calibration" ("ACC"). As shown in FIG. 12, a plurality of color standard references 100 covering a desired range of colors is used to calibrate the camera. FIG. 13*a* shows six balls as the color standard references, although any number of such color standard references may be used.

According to the invention, any type of color standard reference, such as color chips, photos, or balls, may be used. Preferably, for fruit sorting by color, balls are used as the color standard references because they are more realistic representations of rounded objects, such as fruit, being sorted. In fruit sorting applications, flat color standard references, such as chips or photos, can introduce excessive reflection and image washout. If color chips are bent then washout becomes centered at the bends. Preferably, the size of the color standard reference balls 100 is large in order to provide a good standard sample. However, ball size is constrained by space limitations, e.g., the field of view of the camera, and by the space needed between neighboring balls to reduce the effects of reflection.

While the embodiment of FIG. 12 shows stationary color standard reference balls 100 placed in between sorting lanes, those of ordinary skill will recognize that any method may be used whereby the standard balls 100 are placed in the camera field of view for a sufficient amount of time to allow calibration. FIG. 12 also shows two pairs of sorting lanes, each pair being covered by one camera. However, this arrangement is by way of example and not limitation, as those of ordinary skill will recognize that other arrangements of sorting lanes and cameras can also be used.

Figure 13B:
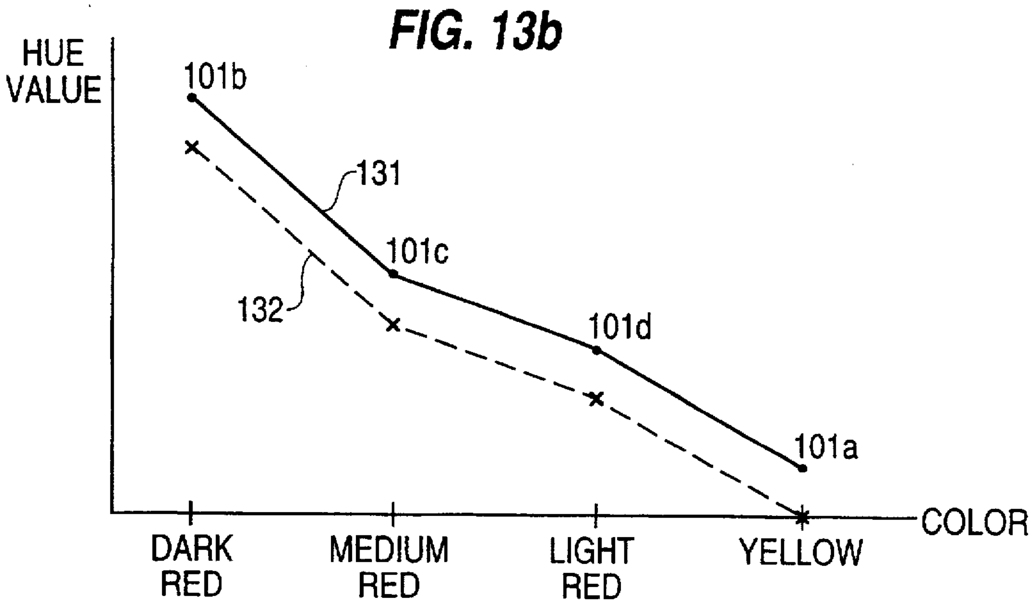
FIG. 13*b* illustrates hue value curves derived from the color standard balls and used for color sorting.

FIG. 13*a* illustrates the color standard references for one preferred embodiment of the invention's ACC scheme used, for example, in sorting red apples. The first color standard reference ball 100*a*, shown as yellow because yellow apples contain the least amount of red color, sets the end point of the curve. The next three balls 100*b*, 100*c*, and 100*d* represent three grades of "red" used to sort the apples. Each of these color standard reference balls is scanned by the camera, and its color is transformed into a corresponding hue value 101, e.g., by the HSI transformation previously described herein. These hue values are plotted in FIG. 13*b* at correspondingly illustrated points (101*a*–101*d*). Interpolation between these points yields the curve 131. The interpolated curve 131 is required to be monotonic, and the hue values are used to sort apples into desired grades, e.g., "Premium," "Fancy," and "Ordinary." Other curves can be generated depending on the variety being sorted. Indeed, specific curves can be programmed into a memory and called up for sorting specific, pre-determined varieties.

Figure 13C:
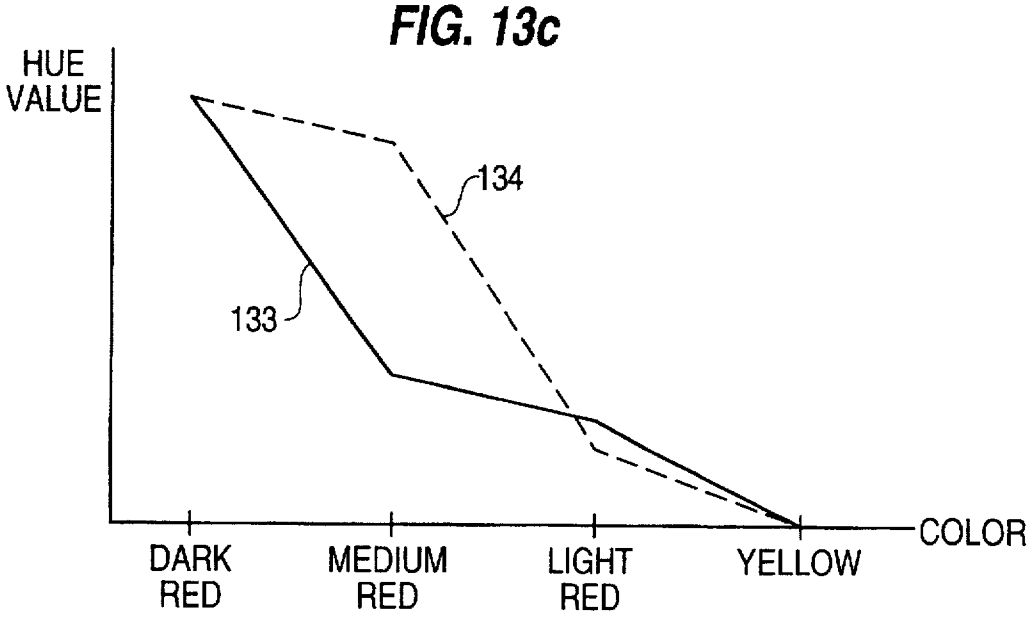
FIG. 13*c* illustrates two different ways of sorting the same range of hue values.

Another important feature according to the invention is that no fixed color definitions need be used in applying the color standard references for calibration. This allows the user the flexibility of redefining sorting grades by storing in a memory the values defining the grades or categories for sorting. For example, by using the same color standard reference balls 100 and redefining the color readings corresponding to these color standard reference balls, curve 132 can be floated up or down to redefine the calibration in the color space. Sorting is accomplished by comparing the measured hue value of the object to be sorted against the hue values corresponding to the ranges defined by the user. The ability to adjust the hue value curves 131 and 132 by varying the color reading of existing color standard balls 100 provides the flexibility for users to set their own relative standards for sorting objects. Changing the slope of the curve adjusts the range between color standard references thereby providing flexible calibration and sorting capability. For example, for sorting one variety of apples, calibration of the ranges between dark red, red, light red, etc. could be different from the ranges calibrated for another kind of apple, depending on the anticipated range of colors in the variety. Curves 133 and 134 of FIG. 13*c* illustrate two different ways to align all the camera in the color space. Curve 133 shows a wide range of hue values between dark red and medium red and a relatively narrow range between medium red and light red. Curve 134 shows a relatively narrow range of dark red hue values and a relatively wide range of medium red hue values. These are given by way of example only in order to illustrate the ability of a system according to the invention to tailor sorting for specific varieties. For example, McIntosh apples have relatively little dark red. Thus, curve 134, which has a narrow dark red range and a wide medium red range provides a better separation capability for this variety than would be available from curve 133. Other curves can be generated depending on the variety being sorted. Indeed, specific curves can be programmed into a memory and called up for sorting specific, predetermined varieties.

Figure 14:
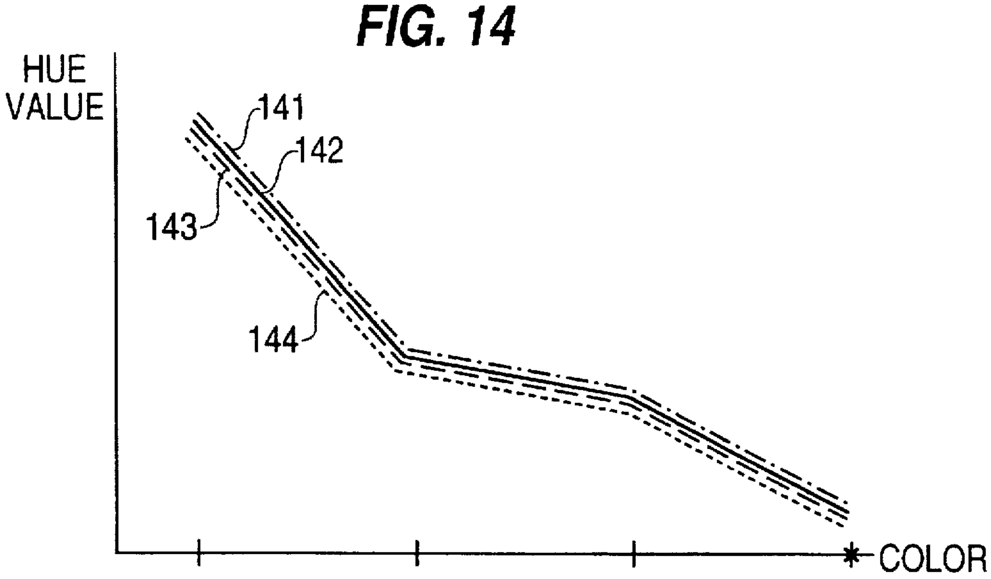
FIG. 14 illustrates the superimposed hue value curves obtained after automatic camera calibration.

Regardless of which curve is chosen as the standard, objects must be sorted in the same way by all cameras within the system. Thus, the transformation of signals from the cameras must be executed such that each sorting lane has the same curve so that all lanes sort fruit in the same way notwithstanding variation in the cameras and other variations. As shown in FIG. 14, ACC calibration causes the standard curves 141, 142, 143, 144, etc., corresponding to cameras 1, 2, 3, 4, etc. respectively, to be essentially identical and therefore to overlap. In other words, ACC starts with differing camera signals and generates standard curves 141, 142, 143, 144 that are superimposed on each other. These standard curves 141–144 also provide a convenient method to monitor the performance of each camera with respect to other cameras.

The method whereby the standard curves 141–144 from the different cameras are made overlapping is now described in more detail. As previously described, the hue value H is a function of color signals R, G, and B. R, G, and B are digital values obtained from intermediate signals r', g', and b' by the transformation $$R = a_r' + b_r'r' + c_r'r'^2$$

$$G = a_g' + b_g'g' + c_g'g'^2$$

$$B = a_b' + b_b'b' + c_b'b'^2.$$

Figure 15:
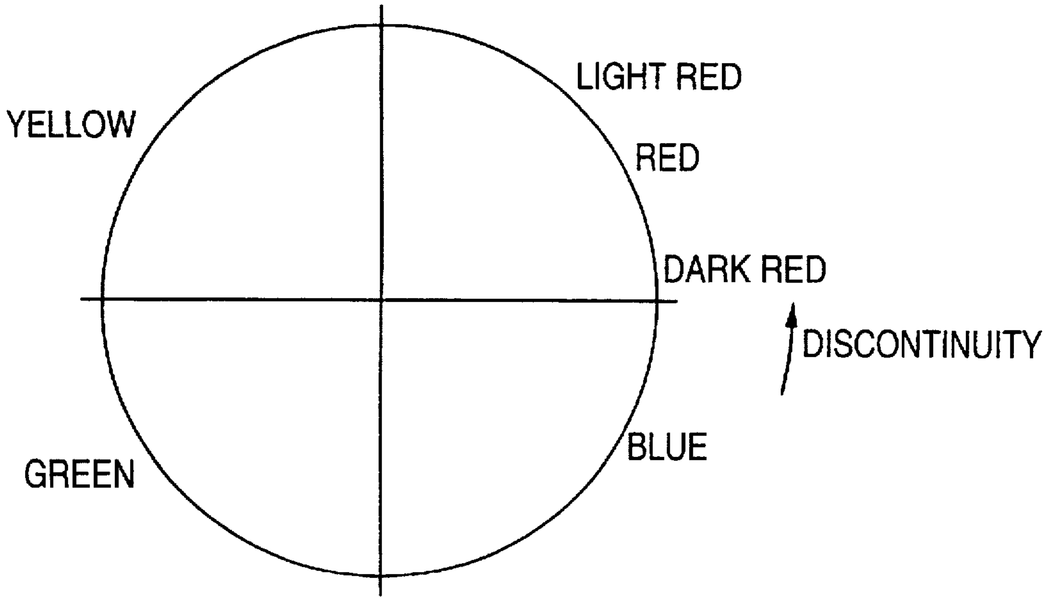
FIG. 15 illustrates the UV plane of the HSI transformation.
Figure 16:
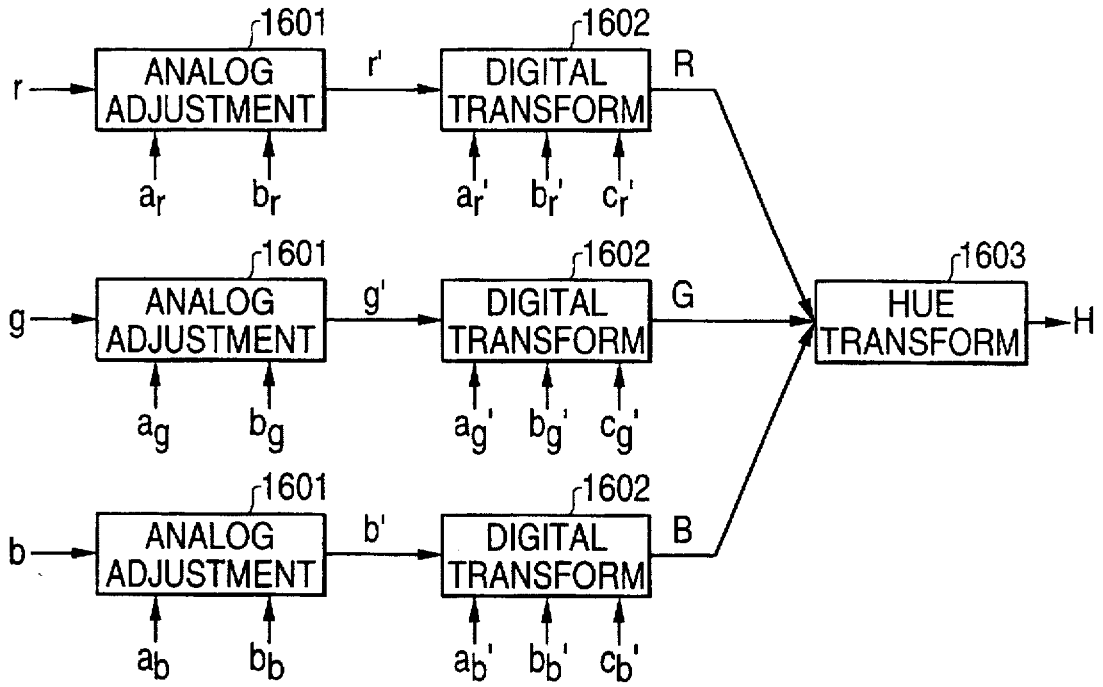
FIG. 16 is a block diagram summarizing the transforms from camera signals to hue.

The a', b', and c' are chosen to maximize color separation while avoiding saturation and washout, and are based on both analysis and experimentation. Saturation refers to the finite number of bits used to represent the digital values. Saturation occurs if R, G, or B exceed the allowed range of values. Washout is a problem associated with the discontinuity of colors in the UV plane, shown in FIG. 15. The scaling of red, blue, and green components to increase separation in the hue value and improve sorting may cause the hue value to cross this discontinuity and result in a grossly inaccurate hue value. For instance, a dark red object may erroneously be converted to a hue value corresponding to a blue object and be "washed out" against the blue background. Third order and higher terms are not retained because of hardware space constraints and because they lead to quicker saturation of the R, G, and B signals.

r', b', and g' are obtained by digitizing modified versions of the original analog camera signals r, g, and b. This transform is given by $$r' = a_r + b_r r$$

$$g' = a_g + b_g g$$

$$b' = a_b + b_b b$$

where the $a_i$ denote constant offset values, and the $b_i$ denote gains. The ACC first stage calibration finds the set of $\{a_r\ b_r\}$, $\{a_g\ b_g\}$, and $\{a_b\ b_b\}$ such that the hue values $H_k$ corresponding to camera k (for cameras 1 through N) are related by $$H_1^j = H_2^j = \ldots = H_N^j$$

where j denotes each of the predetermined colors used for standard setting, e.g., j=1 for dark red, j=2 for medium red, j=3 for light red, and j=4 for yellow. Thus the response of the first camera to the dark red standard is the same as the response of the second through Nth cameras to dark red (j=1). A summary of this transformation from the original camera signals r, g, b to the hue value H is depicted in the block diagram of FIG. 16. The offset and adjustments to the analog to r, g, b signals are shown in blocks 1601 which produces r', g', and b'. These signals and then digitized and up to second order terms are retained, as previously discussed in blocks 1602. This produces the R, G, B signals used by color transfer 303 and image processor 307 to perform the hue transfer in block 1603.

Figure 17A:
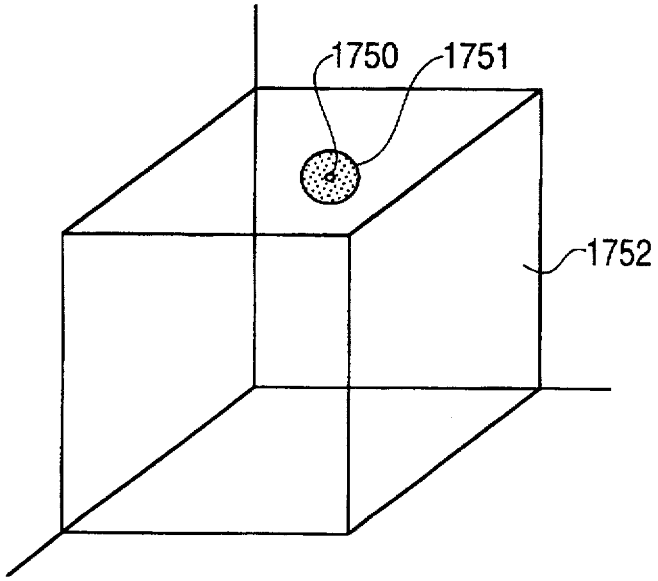
FIG. 17*a* is a diagram showing a search space used in the calibration according to the invention.
Figure 17B:
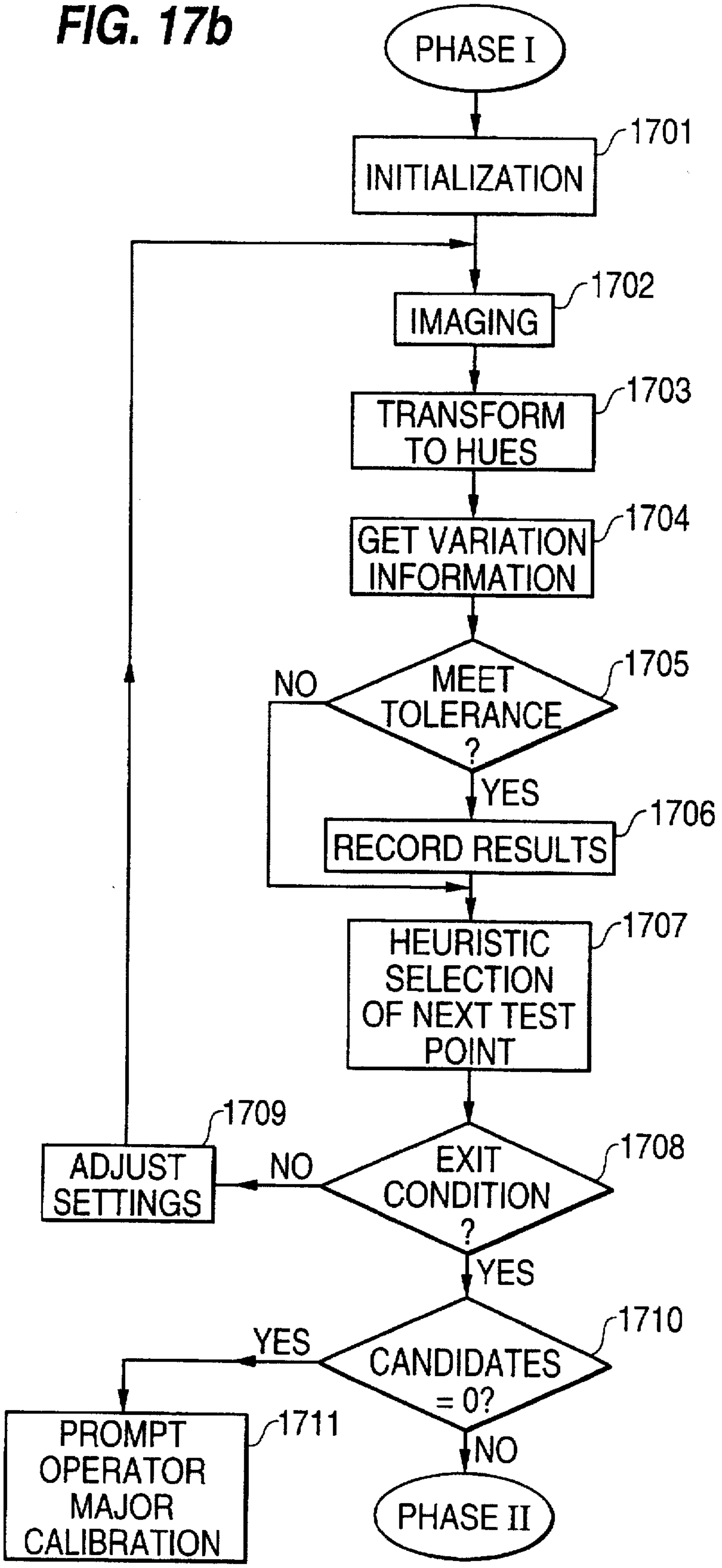
FIGS. 17*b*–17*d* are flowcharts of Phases I, II, and III of the calibration search method.

The $a_i$ and $b_i$ (i=r,g,b) that will achieve proper calibration are found by a three stage iterative process that progressively narrows the search space shown in FIG. 17*a*. These three stages are depicted in the flow charts of FIGS. 17*b*, 17*c*, and 17*d*. Phase I is a large-step search and is illustrated in FIG. 17*b*. In step 1701 the system is initialized from memory with the target hue values for the color standard reference balls, tolerance requirements, an initial set of the $a_i$ and $b_i$ (called the history point), and other control parameters. In steps 1702–1704, images of the color balls are taken, transformed to a hue value, and the variation from the target hue value is calculated. In step 1705, if the variation is within the specified tolerance the set of $a_i$ and $b_i$ are recorded as a candidate in step 1706; otherwise the settings are discarded. Step 1707 is a heuristic selection of the next test point in the search space. FIG. 17*a* shows that the set of test points is chosen from the local search space 1751 about the history point 1750. The heuristic selection takes into account the history and previous results of the search process, and uses a tree search method. In step 1708, the decision is made whether to exit Phase I. Phase I is exited if a predetermined maximum number of candidates is exceeded, or if the local search space 1751 is exceeded. If Phase I is not complete, the settings are adjusted to reflect the new $a_i$ and $b_i$ at step 1709 and the process is repeated starting with step 1702. If the decision is made to exit Phase I, the number of candidate points recorded during Phase I is examined at step 1710. If there are no candidates, i.e., no test points within the local search space satisfied the large step tolerance requirement, step 1711 prompts the operator to perform a major calibration from the overall search. A major calibration is defined as an abandonment of the recorded history point 1750, and a search within the overall search space 1752. If there are m candidates left at the end of Phase I, they are passed to Phase II.

Figure 17C:
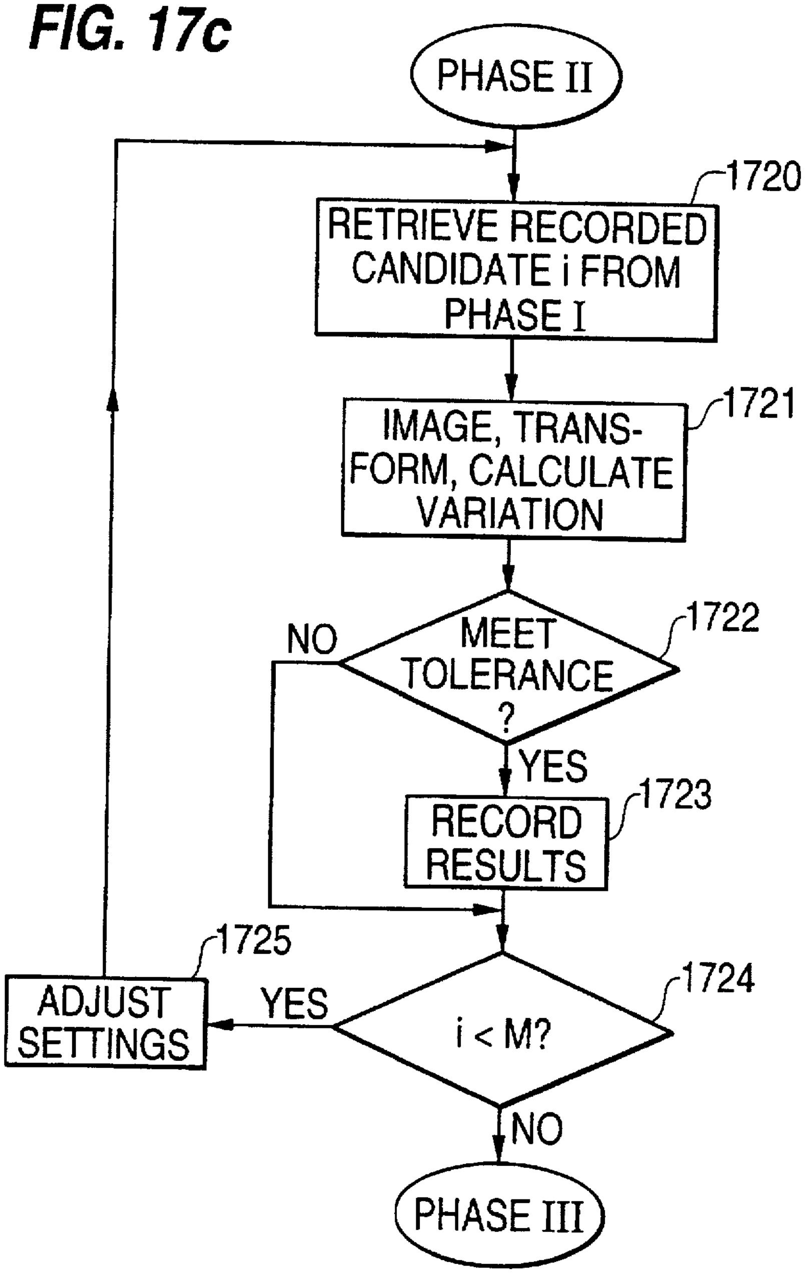

Phase II, shown in FIG. 17*c*, is a fine-step search similar to that of Phase I, except that a stricter tolerance is employed. In steps 1720 and 1721, the recorded settings from candidate i are retrieved and used to image the color ball, transform the color signals to a hue value, and calculate the difference from the target hue value. At steps 1722 and 1723, if the difference meets the Phase II requirement (which is stricter than the Phase I tolerance requirement), then the candidate is retained. This process is repeated for each of the m candidates from Phase I. Phase II thus narrows the number of candidates from m to n, where m≦n. These n remaining candidates are passed to Phase III.

Figure 17D:
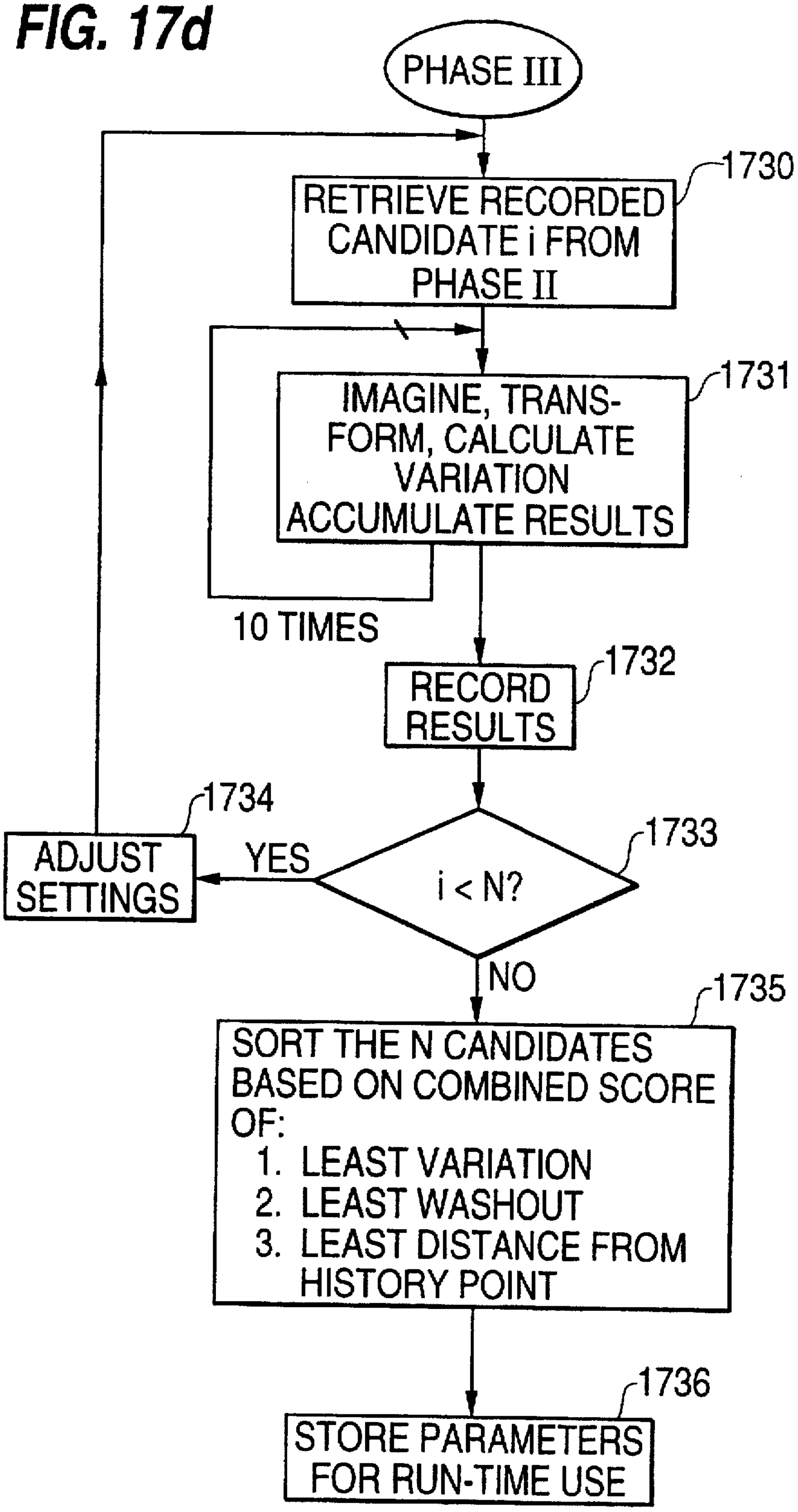

Phase III is described by the flow diagram of FIG. 17*d*. Steps 1730–1732 show that, for each remaining candidate i, multiple images of the subject color standard ball are taken using the corresponding set of $[a_i\ b_i]$ and the hue variations from the target value are accumulated and stored. Multiple images and transforms are used to reduce noise and increase accuracy. Step 1731 shows ten scans for each setting, though this is by way of example and not limitation. Step 1735 shows the final selection of $[a_r\ b_r]$, $[a_g\ b_g]$, and $[a_b\ b_b]$ on the basis of the best combined score of three factors: 1) least variation from the target hue value, 2) least washout, and 3) least distance from the history point. In step 1436, these final values of $[a_r\ b_r]$, $[a_g\ b_g]$, and $[a_b\ b_b]$ are stored in memory for run-time use. After this process, the standard curves 141–144 of FIG. 14 will be superimposed.

Figure 18:
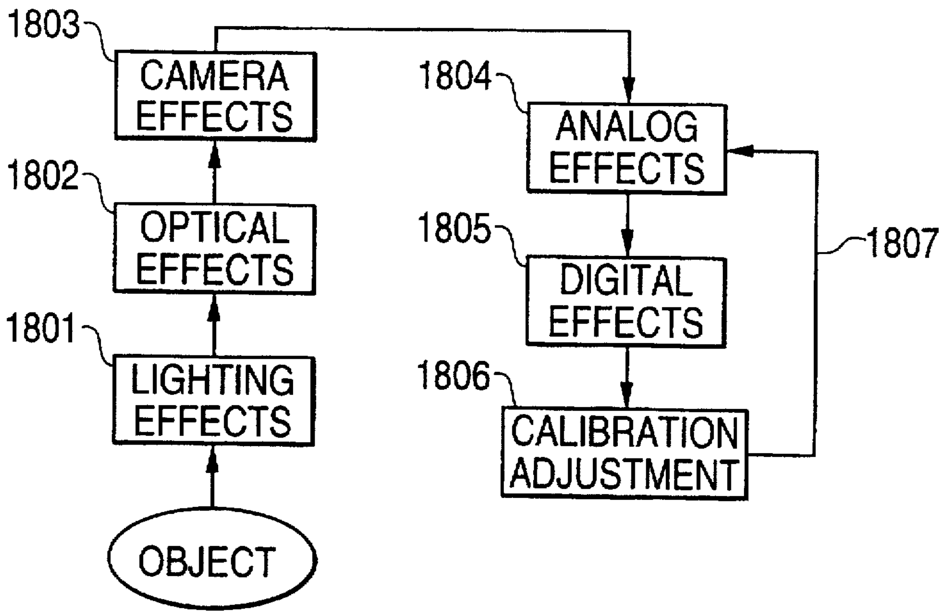
FIG. 18 is a block diagram illustrating the closed-loop automatic camera calibration concept.

It is important to note that ACC according to the invention is a closed-loop, final hue value calibration that accounts for <u>all</u> variations in the system, including lighting, dust, lens imperfections, RGB variations in cameras, cable losses, digitization and transform round-off errors, aging and temperature effects, etc. This concept is illustrated in the block diagram of FIG. 18. A system having ACC according to the invention therefore provides a robust system that eliminates the need for frequent maintenance and individual calibration of components, and also allows for the use of lower quality equipment.

Another aspect of a camera calibration scheme according to the invention calibrates each camera so that all lanes sort identically. Even after ACC is performed and all cameras generate identical hue value curves 131 from the same color standard balls 100, the lanes may still sort objects, such as fruit, differently due to optical gradients between the center of view and the boundary in each camera. These optical variations may be due to imperfections in the lens, dust, lighting variations, etc. These variations may cause each camera to read its two lanes and the different views of objects within each lane, typically four views as previously discussed, differently. Thus, color variations may exist between the same color object viewed from different locations by the same camera. For instance, referring to FIG. 5, identical color standard balls viewed at positions f1 and f8 may result in different hue values.

An adjustment for variations from the lens center according to the invention is termed "dynamic automatic camera calibration" ("DACC") as described further herein.

Figure 19:
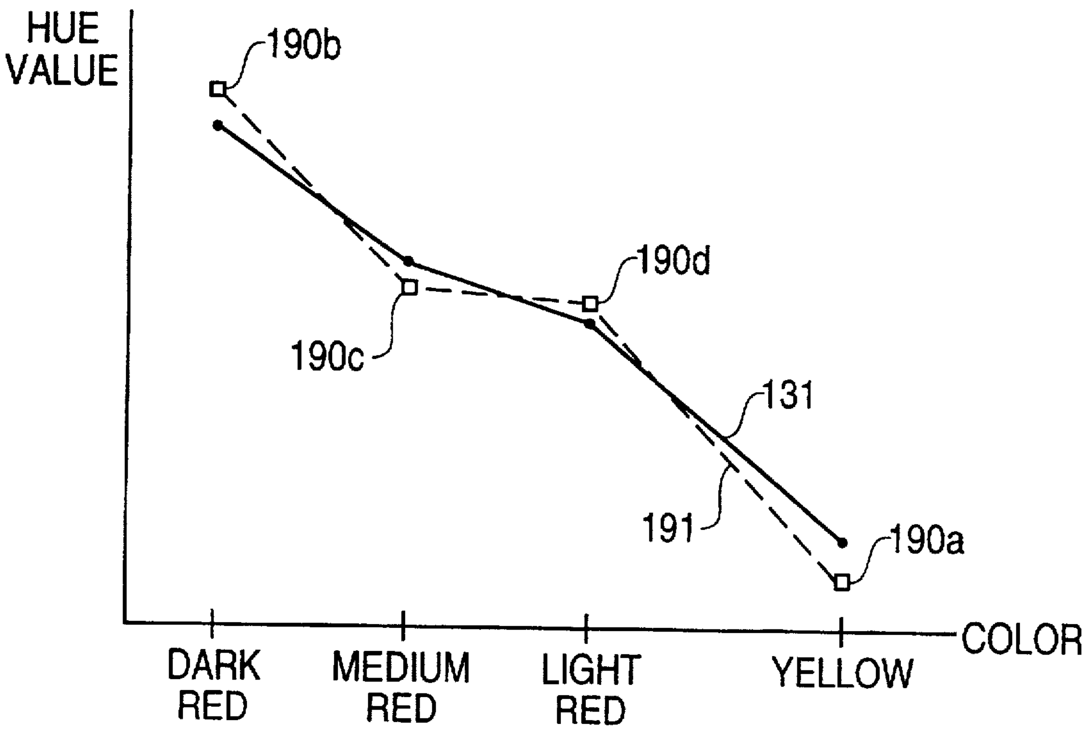
FIG. 19 illustrates variations from the hue standard curve when color balls are passed through the system during dynamic automatic camera calibration.

For DACC, each color standard reference ball 100 is passed through the system as though it were an object to be sorted and scanned in the same manner as for a sorted object. As shown in FIG. 19, the hue value of each color standard ball 100 is calculated and is compared to a stored standard curve, such as a curve 131 derived from ACC, as described previously herein. This comparison is performed for each of the four viewing windows in each lane of the apparatus as shown in FIG. 5 and 6. For each window, the variations from the standard curve are stored in memory in a correction table and used as a run-time correction when grading fruit or other objects.

During run-time, the correction table provides an exact hue correction value for the corresponding window if the hue value of the object being sorted equals the hue value obtained from passing a color standard reference ball through the system while performing DACC, i.e., at the points 190*b*, 190*c*, 190*d*, or 190*a*. For each viewing window, the number of correction values corresponds to the number of color reference balls. If there are four color reference balls, four corrections are stored, each correction value corresponding to the hue value measured for a reference. During sorting operations, when an object produces a hue value different from one of the four reference hue values, the hue value correction for the object is obtained by interpolation of the correction values corresponding to the closest reference hue values above and below the hue value of the object. Typically, the interpolation is linear.

Figure 20A:
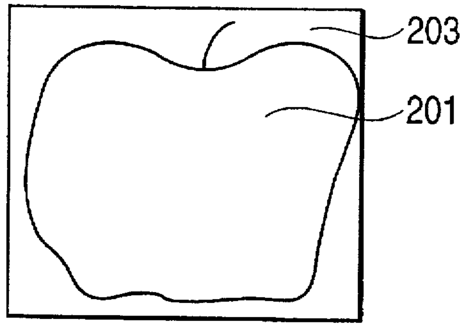
FIG. 20*a*–20*b* illustrate a large object to be sorted and a small object to be sorted against the background.
Figure 20B:
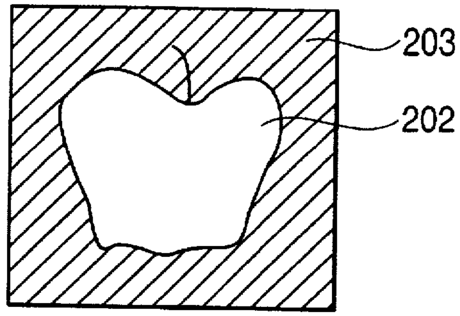

Another feature according to the invention is a fine tuning adjustment, which addresses the problem of undersized objects such as fruit appearing darker or lighter than usual due to background effects. The fine tuning adjustment is performed "on the fly," and is independent of ACC or DACC camera calibration. FIG. 20*a* shows a large piece of fruit 201, such that the view from the camera is 80% apple and 20% background. FIG. 20*b* shows a small piece of fruit 202, such that the view from the camera is 40% apple and 60% background. The signals corresponding to the small fruit 20 thus have a smaller signal to noise ratio ("SNR") than signals for the large fruit 20. As a result, the small fruit may appear darker because of the dominant dark background 203. Furthermore, large fruit and small fruit of the same color may also appear different due to differences in curvature and reflection.

Figure 20C:
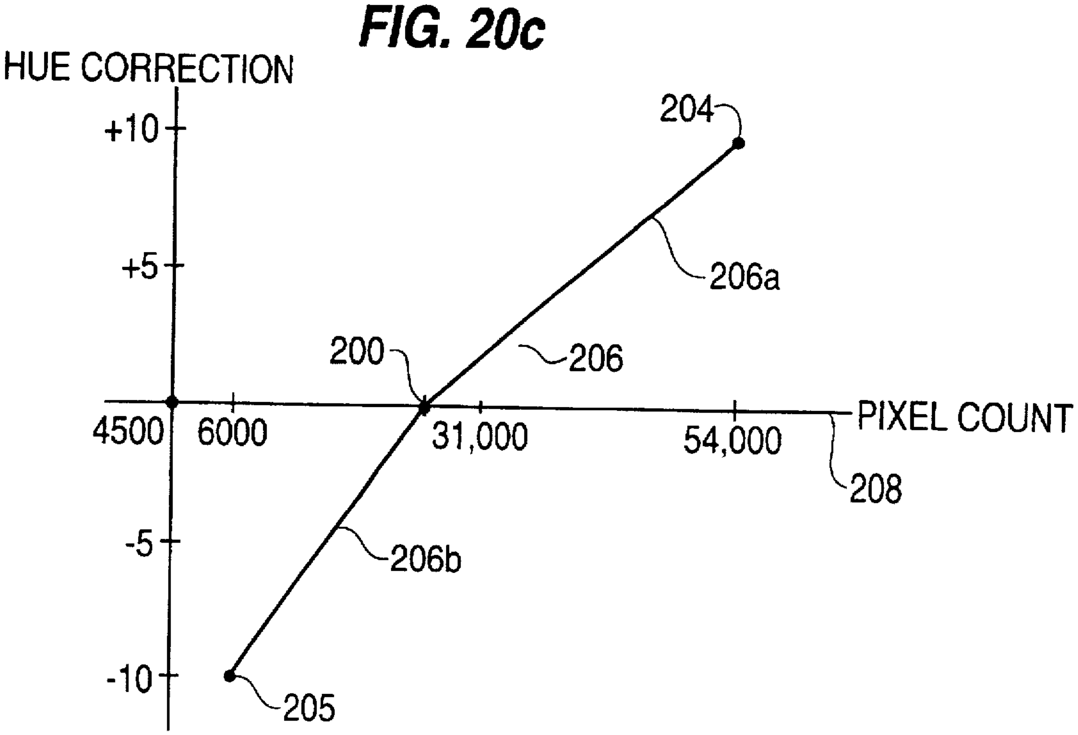
FIG. 20*c* illustrates fine tuning to adjust for different sized objects.

As illustrated in FIG. 20*c* (not drawn to scale), the fine tuning adjustment according to the invention compensates for this effect by adjusting the calculated hue values. First, a hinge point 200 corresponding to the mean size of the fruit and two end points corresponding to a large and small fruit are chosen as reference points. FIG. 20*c* shows the hinge point 200 at a pixel count of 31,000, and the endpoints at 6000 and 54,000 pixels, for example. This includes the four views of the object. A value of, for example, 4500 pixels or less indicates an empty cup. A hue correction value $\alpha$ associated with the upper endpoint and a hue correction value $\beta$ associated with the lower endpoint is chosen by the user; these values are adjustable and can be changed during run-time. It should be noted that the end points 204 and 205 are not necessary, as the compensation can actually be determined by specifying the angle and projecting the lines 206*a* and 206*b* from the horizontal axis 208 shown in FIG. 20*c*.

FIG. 20*c* shows $\alpha=10$ and $\beta=-8$. These correction values are plotted at correspondingly illustrated points 204 and 205 in FIG. 20*c*. Points 203, 204, and 205 are joined to form a two stage linear curve 206 having components shown as 206*a* and 206*b*. The size of an object to be sorted, such as fruit, is determined via a pixel count. The hue value calculated from the object to be sorted is adjusted according to the curve 206 to achieve a final hue value. It should be noted that, according to the invention, the scale factors $\alpha$ and $\beta$ are adjustable such that either or both scale factors can be positive or negative. Therefore the hue values small and large objects may both be scaled up or down. One of ordinary skill would also realize that the hinge point, corresponding to a hue correction of "0", need not be associated with the average fruit size, and that FIG. 20*c* shows three reference points 200, 204, and 205 by way of example and not limitation. Any number of such reference points may be used.

Figure 21:
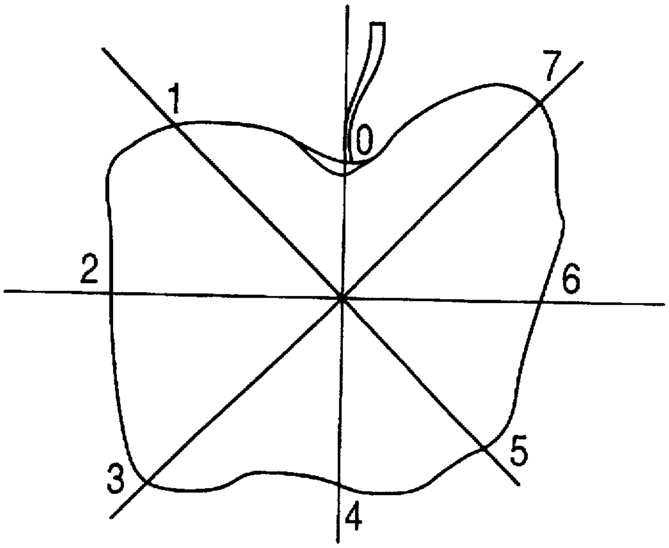
FIG. 21 illustrates the height and diameters used in shape sorting.

Another feature according to the invention is shape sorting, which sorts fruit into "elongated," "round," and "flattened" categories. In FIG. 21, the height 0–4 and the diameters 2–6, 1–5, 3–7 are calculated using pixel counts. An elongation factor τ is calculated as the ratio of the height 0–4 to the major diameter 2–6. The threshold value of τ is programmed to sort fruit into the above mentioned categories. By setting multiple threshold levels of τ, fruit can be sorted into any number of levels of elongation. One of ordinary skill would also realize that any combination of the height 0–4 and diameters 1–5, 2–6, 3–7 can be used for sorting, such as for instance sorting deformed fruit. A control system, such as that previously discussed herein, can be activated to deposit the objects being sorted into appropriate collection bins.

Another feature according to the invention is a rotation compensation, which ensures that objects to be sorted, such as fruit, are analyzed for one and only one full rotation. Without such a feature, certain regions of the object may be viewed more than once and skew the sorting result; for instance, a red side viewed twice could make an apple appear too red, while a yellow spot viewed twice could incorrectly reduce the grade of the fruit. Rotation compensation stops the analysis of the object to be sorted after one full rotation; the excess data after one rotation is ignored. To determine when one full rotation is complete, the diameter D of the object is first found. Next, the distance the object travels in one full rotation is calculated. This distance L is found by the formula:

$$L=\pi D f_c;$$

where $f_c$, is an empirically obtained factor accounting for variations from the ideal rotation distance πD due to factors such as friction, fruit size, rotation speed, etc. The value of $f_c$, is currently 1.0/0.8. Once L has been determined, information is only collected for the object when it is in the interval between 0 and L under the camera viewing window; any subsequent data from the object is ignored.

In each of the above methods and apparatus, reference values, such as hinge points, color standard references, shape and diameter criteria, physical parameters such as image area, and other values may be stored in a memory. Special purpose or general purpose processors may be used to carry out the steps of the disclosed methods. The steps may be carried out in hardware or software.

While specific embodiments of the invention have been described and illustrated, it will be clear that variations in the details of the embodiments specifically illustrated and described may be made without departing from the true spirit and scope of the invention as defined in the appended claims.

What is claimed is:

1. A method of calibrating a plurality of cameras to produce substantially uniform measures of color of imaged objects, the method comprising the steps of:

imaging a color standard reference of a same color with each camera and producing color signals from each camera;

in a processor, transforming said color signals produced by each said camera in response to said color standard reference into a single hue value, such that said hue value is the same for each said camera imaging said color standard reference said hue value being selectable to define said calibration in a color space, wherein said processor performs a further transformation to provide a stable hue value under predetermined circumstances, wherein said hue value is a function of an angle defined by a predetermined relationship of red, green and blue signals from an imaging device, wherein said further transformation shifts an axis according to angles of each position in a plane, such that said hue value is determined from a position in a line defined by said angle, said position being substantially insensitive to errors to thereby generate a stable hue value, wherein said further transformation produces a hue value, h', defined as:

$$h' = \left[ \left( \tan^{-1}\frac{V_2}{V_1+\chi} \right) * \left( \frac{Q_1-\alpha}{Q_1} \right) + \alpha \right] * \frac{255}{360}$$

where $$\chi = \chi_0 - \frac{Q-Q_0}{(Q_1-Q_0)\gamma_0}$$

Q=the angle of the position on the UV or $[V_\alpha V_1]$ $V_2V_1$ plane $Q_0$=constant $0 \leqq \pi$ $Q_1$=constant $0 \leqq \pi$ $\gamma_0$=constant $-255 \leqq \gamma_0 \leqq 255$ $\chi_0$=constant $-255 \leqq \chi_0 \leqq 255$ α=offset $-\pi \leqq \alpha \leqq \pi$.

2. A method of calibrating a plurality of cameras to produce substantially uniform measures of color of imaged objects, the method comprising the steps of:

imaging a color standard reference of a same color with each camera and producing color signals from each camera;

in a processor, transforming said color signals produced by each said camera in response to said color standard reference into a single hue value, such that said hue value is the same for each said camera imaging said color standard reference said hue value being selectable to define said calibration in a color space, wherein said processor performs a further transformation to provide a stable hue value under predetermined circumstances, wherein said further transformation shifts an axis according to angles of each position in a plane, such that said hue value is determined from a position in a line defined by said angle, said position being substantially insensitive to errors to thereby generate a stable hue value, wherein said further transformation produces a hue value, h', defined as:

$$h' = \left[ \left( \tan^{-1}\frac{V_2}{V_1+\chi} \right) * \left( \frac{Q_1-\alpha}{Q_1} \right) + \alpha \right] * \frac{255}{360}$$

where $$\chi = \chi_0 - \frac{Q-Q_0}{(Q_1-Q_0)\gamma_0}$$

Q =the angle of the position on the UV or $V_2V_1$ plane $Q_0$=constant $0 \leqq \pi$ $Q_1$=constant $0 \leqq \pi$ $\gamma_0$=constant $-255 \leqq \gamma_0 \leqq 255$ $\chi_0$=constant $-255 \leqq \chi_0 \leqq 255$ α=offset $- \leqq \alpha \leqq \pi$.

* * * * *